(12) United States Patent
Markham et al.

(10) Patent No.: US 11,457,093 B2
(45) Date of Patent: Sep. 27, 2022

(54) METHODS AND APPARATUSES FOR BATCH RADIO RESOURCE COMMAND AND CONTROL

(71) Applicant: CACI, Inc.—Federal, Arlington, VA (US)

(72) Inventors: Adam Christopher Markham, Golden, CO (US); Brett Michael Brotherton, Arvada, CO (US); Kevin Michael Dyer, Broomfield, CO (US)

(73) Assignee: LGS Innovations LLC, Herndon, VA (US)

( * ) Notice: Subject to any disclaimer, the term of this patent is extended or adjusted under 35 U.S.C. 154(b) by 0 days.

(21) Appl. No.: 17/158,554

(22) Filed: Jan. 26, 2021

(65) Prior Publication Data
US 2021/0152657 A1 May 20, 2021

Related U.S. Application Data

(63) Continuation of application No. 15/628,031, filed on Jun. 20, 2017, now Pat. No. 10,979,530.
(Continued)

(51) Int. Cl.
*H04W 36/06* (2009.01)
*H04W 28/08* (2009.01)
(Continued)

(52) U.S. Cl.
CPC .............. *H04L 67/60* (2022.05); *H04B 7/26* (2013.01); *H04L 41/12* (2013.01); *H04L 41/145* (2013.01);
(Continued)

(58) Field of Classification Search
CPC ......... H04L 67/32; H04L 41/22; H04L 41/12; H04L 41/145; H04L 43/04; H04L 43/50;
(Continued)

(56) References Cited

U.S. PATENT DOCUMENTS

| 4,697,284 A | 9/1987 | Glance |
| 5,953,319 A * | 9/1999 | Dutta .................... H04W 72/02 370/238 |

(Continued)

OTHER PUBLICATIONS

Cisco Systems Inc., Configuring Modem Support and Asynchronous Devices (Year: 1997).*
(Continued)

*Primary Examiner* — Soe Hlaing
(74) *Attorney, Agent, or Firm* — BakerHostetler; Tayan B. Patel

(57) ABSTRACT

The application describes an apparatus including a single application processor operably coupled to a non-transitory memory including instructions stored thereon. The apparatus also includes plural, discrete radio resources operably in communication with the single application processor. Each radio resource includes a modem operating on a network selected from at least one of LoRA, digital mobile radio and metro access network. In the apparatus, the single application processor is configured to execute the instructions of discovering the modem of each discrete radio resource. The single application processor is also configured to execute the instructions of assigning a TCP port to each discovered modem. In addition, the single application processor is configured to execute the instructions of creating an individualized session for each modem. Further, the single application processor is configured to execute the instructions of scanning an area experiencing limited connectivity for mobile equipment located a predetermined distance away from the single application processor.

19 Claims, 22 Drawing Sheets

Related U.S. Application Data

(60) Provisional application No. 62/466,565, filed on Mar. 3, 2017.

(51) Int. Cl.

| | | |
|---|---|---|
| *H04W 24/08* | (2009.01) | |
| *H04W 88/04* | (2009.01) | |
| *H04W 36/24* | (2009.01) | |
| *H04W 4/70* | (2018.01) | |
| *H04L 67/51* | (2022.01) | |
| *H04L 41/12* | (2022.01) | |
| *H04L 67/60* | (2022.01) | |
| *H04L 43/50* | (2022.01) | |
| *H04L 43/04* | (2022.01) | |
| *H04L 43/0805* | (2022.01) | |
| *H04L 67/14* | (2022.01) | |
| *H04L 43/08* | (2022.01) | |
| *H04B 7/26* | (2006.01) | |
| *H04L 41/22* | (2022.01) | |
| *H04L 41/14* | (2022.01) | |
| *H04W 28/02* | (2009.01) | |
| *H04W 72/08* | (2009.01) | |

(52) U.S. Cl.
CPC .............. *H04L 41/22* (2013.01); *H04L 43/04* (2013.01); *H04L 43/50* (2013.01); *H04L 67/51* (2022.05); *H04W 24/08* (2013.01); *H04W 28/0231* (2013.01); *H04W 28/08* (2013.01); *H04W 36/06* (2013.01); *H04W 36/24* (2013.01); *H04W 72/085* (2013.01); *H04W 88/04* (2013.01); *H04L 43/08* (2013.01); *H04L 43/0805* (2013.01); *H04L 67/14* (2013.01); *H04W 4/70* (2018.02)

(58) Field of Classification Search
CPC ..... H04L 67/16; H04L 43/08; H04L 43/0805; H04L 67/14; H04W 24/08; H04W 28/0231; H04W 28/08; H04W 36/06; H04W 36/24; H04W 72/085; H04W 88/04; H04W 4/70; H04B 7/26
See application file for complete search history.

(56) References Cited

U.S. PATENT DOCUMENTS

| | | | |
|---|---|---|---|
| 6,456,849 B1 | 9/2002 | Purnadi et al. | |
| 7,106,971 B1 | 9/2006 | Davis | |
| 7,158,493 B1 | 1/2007 | Uhlik et al. | |
| 8,565,742 B2* | 10/2013 | Lee | H04W 76/40 |
| | | | 455/414.1 |
| 9,980,171 B2 | 5/2018 | Stein et al. | |
| 10,349,462 B2 | 7/2019 | Altman et al. | |
| 10,530,891 B2 | 1/2020 | Markham et al. | |
| 2003/0169722 A1 | 9/2003 | Petrus et al. | |
| 2004/0013430 A1 | 1/2004 | Asami et al. | |
| 2004/0033796 A1* | 2/2004 | Remy | G01S 5/0231 |
| | | | 455/404.2 |
| 2004/0146072 A1 | 7/2004 | Farmwald | |
| 2004/0156350 A1 | 8/2004 | Brasic et al. | |
| 2004/0208646 A1 | 10/2004 | Choudhary et al. | |
| 2004/0229621 A1 | 11/2004 | Misra | |
| 2006/0039380 A1 | 2/2006 | Cloonan et al. | |
| 2006/0068811 A1* | 3/2006 | Adya | H04W 12/122 |
| | | | 455/456.2 |
| 2006/0123133 A1 | 6/2006 | Hrastar | |
| 2006/0153093 A1 | 7/2006 | Cloonan et al. | |
| 2006/0182139 A1 | 8/2006 | Bugajski et al. | |
| 2008/0186882 A1 | 8/2008 | Scherzer et al. | |
| 2009/0028128 A1 | 1/2009 | Trott et al. | |
| 2010/0173667 A1* | 7/2010 | Hui | H04W 72/048 |
| | | | 455/552.1 |
| 2010/0195497 A1 | 8/2010 | Iyer et al. | |
| 2010/0322214 A1 | 12/2010 | Workman et al. | |
| 2012/0040684 A1 | 2/2012 | Gao et al. | |
| 2012/0307676 A1 | 12/2012 | Chan et al. | |
| 2013/0155231 A1 | 6/2013 | Ohayon et al. | |
| 2013/0182620 A1 | 7/2013 | Chaffee et al. | |
| 2014/0153481 A1 | 6/2014 | Draznin et al. | |
| 2014/0204924 A1 | 7/2014 | Ryu et al. | |
| 2014/0211698 A1 | 7/2014 | Aguirre et al. | |
| 2014/0287742 A1 | 9/2014 | Watanabe | |
| 2014/0330960 A1* | 11/2014 | Haga | H04L 43/04 |
| | | | 709/224 |
| 2014/0349704 A1 | 11/2014 | Xiao et al. | |
| 2014/0355446 A1* | 12/2014 | Altman | H04W 28/0289 |
| | | | 370/235 |
| 2015/0181466 A1 | 6/2015 | Tian et al. | |
| 2015/0288542 A1 | 10/2015 | Ashrafi et al. | |
| 2015/0304889 A1 | 10/2015 | Qian et al. | |
| 2016/0183147 A1 | 6/2016 | Da et al. | |
| 2016/0204866 A1 | 7/2016 | Boroson et al. | |
| 2016/0269884 A1* | 9/2016 | Lo | H04J 15/00 |
| 2017/0006586 A1 | 1/2017 | Gulati et al. | |
| 2017/0013406 A1* | 1/2017 | Oliver | H04L 65/608 |
| 2017/0094558 A1 | 3/2017 | Buyuktosunoglu et al. | |
| 2017/0181113 A1 | 6/2017 | Keyser-Allen et al. | |
| 2017/0230832 A1* | 8/2017 | Ophir | H04W 12/06 |
| 2017/0251393 A1 | 8/2017 | Cui et al. | |
| 2017/0251515 A1 | 8/2017 | Altman et al. | |
| 2018/0063748 A1 | 3/2018 | Ling et al. | |
| 2018/0146350 A1 | 5/2018 | Khan | |
| 2018/0176897 A1 | 6/2018 | Khan et al. | |

OTHER PUBLICATIONS

Configuring Modem Support and Asynchronous Devices, Copyright 1989-1997, Cisco Systems http://www.employees.org/univercd/Feb-1998/CiscoCD/cc/td/doc/product/software/ios113ed/113ed_cr/dial_c/dcprt1/dcmodem.htm (Year: 1997).

* cited by examiner

METHODS AND APPARATUSES FOR BATCH RADIO RESOURCE COMMAND AND CONTROL

CROSS-REFERENCE TO RELATED APPLICATIONS

This application is a continuation of U.S. patent application Ser. No. 15/628,031, filed Jun. 20, 2017, which claims the benefit of U.S. Provisional Patent Application No. 62/466,565, filed Mar. 3, 2017, the entire disclosures of both of which are hereby incorporated by reference as if set forth in their entirety herein.

FIELD

This application is generally related to coordinated batch processing of radio resources.

BACKGROUND

Mobile devices are ubiquitous in today's digital age. Indeed, mobile devices such as for example smartphones are on pace to exceed landline phones by 2020. With their ability to employ software applications, smartphones provide users with a customized experience far surpassing non-smartphones, e.g., dumb phones.

Generally, smartphone users communicate and navigate the internet via cellular networks when not on Wi-Fi. However, communications on smartphones face distinct challenges depending upon location. For example, smartphones may have limited or no network connectivity in locations inherently having unreliable network coverage, e.g., on a mountain, in the desert, or at a ski resort.

Cellular connectivity may also be compromised when significant numbers of users operate their smartphones in close proximity. In particular, compromised connectivity is often experienced by users at large sporting events, concerts or outdoor rallies/parades attempting to place voice calls, send SMS messages, and/or use data 3G/4G/LTE data services for the internet, commercial messaging applications (CMAs), etc. Unfortunately, it may be at these types of events and times when the need to communicate with other smartphone users may be at its peak.

While satellite phones and 2-way radios, e.g., walkie-talkies, may exist in the marketplace as alternatives to smartphones relying on cellular network coverage, these options have significant drawbacks. Indeed, satellite phones are too expensive for ordinary users to purchase, and ultimately use on a consistent basis. 2-way radios do not provide rich forms of communication expected by smartphone users. 2-way radios also do not offer users the reliability of communications being protected from common third party interception. Moreover, specialized equipment is typically much heavier than modern smart phones and provides for a reduced user experience based on target market volumes. In addition, specialized equipment reduces the ability to interact and extend networks while allowing users to interact with familiar technologies and user interfaces.

What is desired in the art is an apparatus and method for extending cellular coverage to mobile device users in locations with limited or no network connectivity.

What is also desired in the art is an apparatus and method for providing rich transmission of communications to or from a mobile device user in locations with limited or no network connectivity.

SUMMARY

The foregoing needs are met, to a great extent, by the application, at least directed to techniques and systems for managing a network of radio resources.

One aspect of the application is directed to an apparatus including a single application processor. The apparatus also includes a non-transitory memory including instructions stored thereon, and operably in communication with the single application processor. The apparatus also includes plural, discrete radio resources each including a modem operating on a network selected from at least one of LoRA, digital mobile radio and metro access network, and operably in communication with the single application processor. In the apparatus, the single application processor is configured to execute the instructions of discovering the modem of each discrete radio resource. The single application processor is also configured to execute the instructions of assigning a TCP port to each modem. In addition, the single application processor is also configured to execute the instructions of creating an individualized session for each modem. The single application processor is also configured to execute the instructions of scanning an area experiencing limited connectivity for mobile equipment located a predetermined distance away from the single application processor. Embodiments of this aspect include corresponding methods, computer systems and computer programs recorded on one or more computer storage devices.

Another aspect of the application is directed to a system including a single application processor operably coupled to a non-transitory memory including instructions stored thereon. The system also includes plural, discrete radio resources each including a modem operating on a network selected from at least two of LoRA, digital mobile radio and metro access network, and each operably in communication with the single application processor. The system is configured to communicate with mobile equipment positioned in an area experiencing limited network connectivity located a predetermined distance away from the single application processor. Other embodiments of this aspect include corresponding methods and computer programs recorded on one or more computer storage devices.

Yet a further aspect of the application is directed to a computer readable medium containing program instructions that when executed by a processor perform a series of actions. One of the instructions includes discovering a modem for each of plural discrete radio resources operating on a network. The network is selected from at least one of LoRA, digital mobile radio and metro access network. Another one of the instructions includes assigning a TCP port to each of the modems. Yet another one of the instructions includes creating an individualized session for each of the modems. Yet even another one of the instructions includes communicating with mobile equipment positioned in an area experiencing limited network connectivity and located a predetermined distance away from the processor. Other embodiments of this aspect include corresponding computer systems, apparatuses and methods.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

FIG. 16 illustrates another GUI of modem managers and their respective radio resource count in a specified location.

FIG. 17 illustrates a GUI of the communication system showing information of the radio resources identified in FIG. 16.

FIGS. 18A-E illustrate GUIs of a communication system according to another embodiment.

DETAILED DESCRIPTION

Figure 1A:
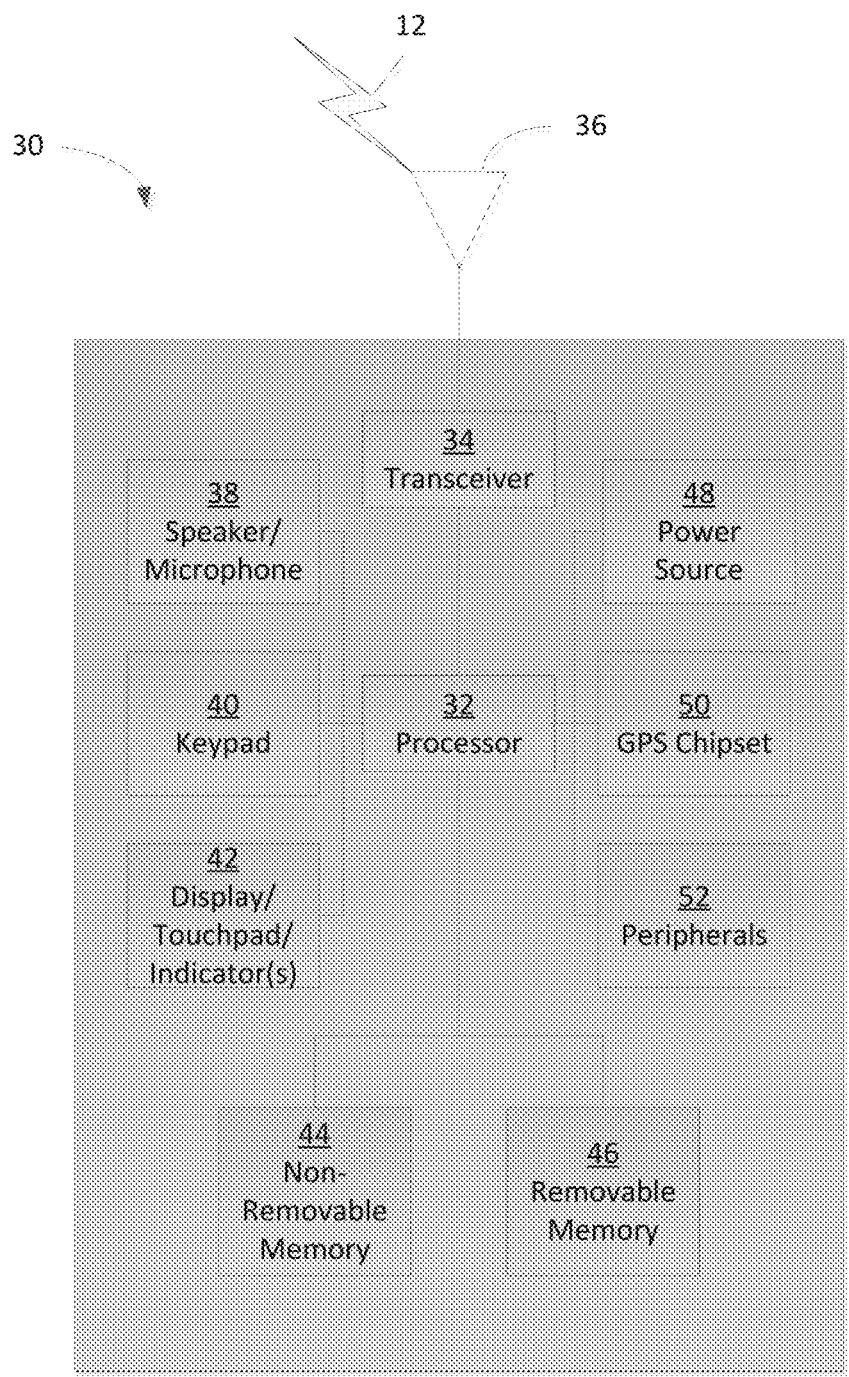
FIG. 1A illustrates a node or user equipment (UE) according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

According to the application, the cellular network may be a CDMA, TDMA, FDMA, OFDMA, or a SC-FDMA network. CDMA network may implement a radio technology such as Universal Terrestrial Radio Access (UTRA), cdma2000, etc. UTRA includes Wideband CDMA (WCDMA) and other variants of CDMA. A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced (LTE-A) are releases of UMTS that use E-UTRA. UTRA, E-UTRA, UMTS, LTE, LTE-A and GSM are described in documents from an organization named "3rd Generation Partnership Project" (3GPP).

Internet of Things (IoT)

The IoT is the inter-working of physical devices, such as for example, vehicles, home products, smart devices, etc. These devices are embedded with electronics, software, sensors, actuators, and network connectivity which enable these objects to collect and exchange data. Some authorities define IoT as a global infrastructure for the information society, enabling advanced services by interconnecting (physical and virtual) things based on existing and evolving interoperable information and communication technologies. For these purposes a "thing" is "an object of the physical world (physical things) or the information world (virtual things), which is capable of being identified and integrated into communication networks". The IoT allows objects to be sensed or controlled remotely across existing network infrastructure. As a result, opportunities are created for more direct integration of the physical world into computer-based systems resulting in improved efficiency, accuracy. When IoT is augmented with sensors and actuators, the technology becomes an instance of the more general class of cyber-physical systems. This also encompasses technologies, such as for example, smart grids, virtual power plants, smart homes, intelligent transportation and smart cities. Each thing is uniquely identifiable through its embedded computing system and is also able to interoperate within the existing Internet infrastructure. Experts estimate that the IoT will encompass about 30 billion objects by 2020. This application is envisaged to include IoT devices with respect to the descriptions of nodes.

General Architecture

FIG. 1A is a block diagram of an example hardware/software architecture of a node of a network, which may operate as a machine-to-machine (M2M) server, gateway, device, or other node in an M2M network. As shown in FIG. 1A, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the time flexibility functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The computer executable instructions stored in the memory of the node, and executed by the processor. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 1A, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. While FIG. 1A depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1A as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of communications and to provide a graphical user interface.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 1B:
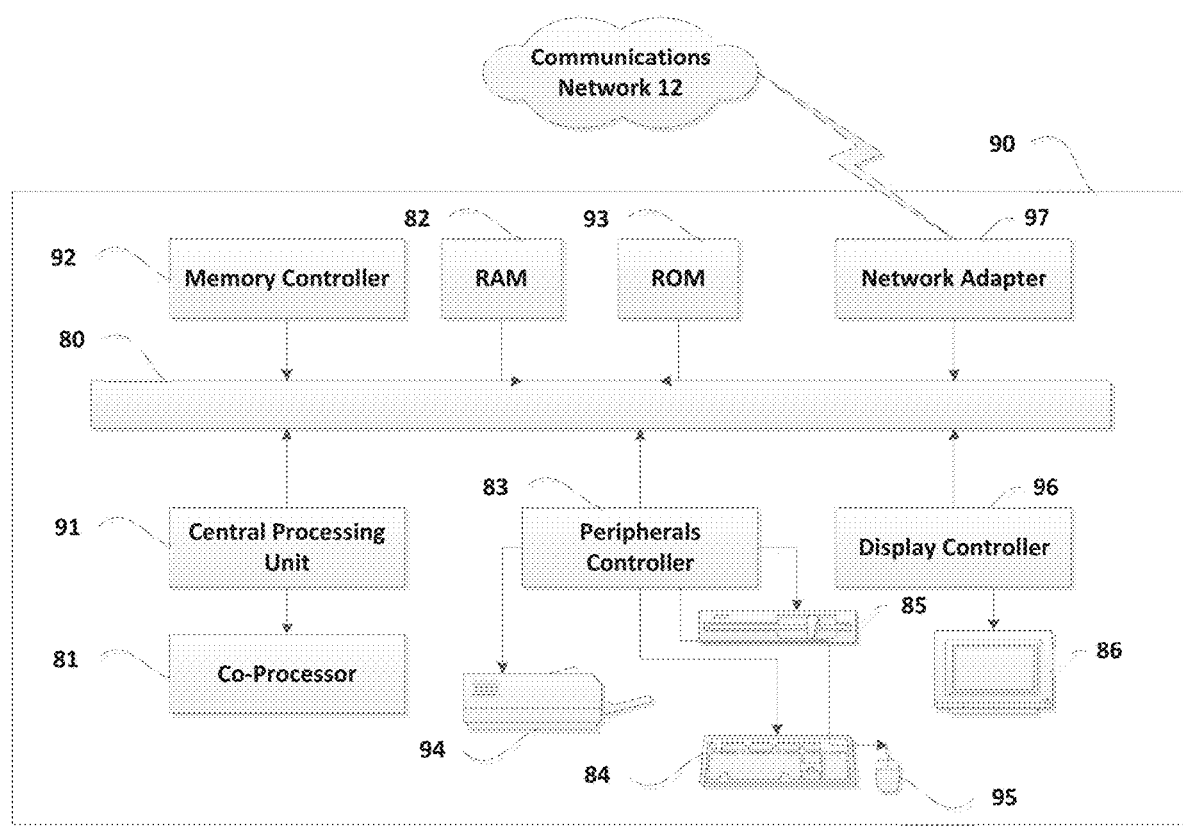
FIG. 1B illustrates an exemplary computing system used to implement one or more nodes according to an aspect of the application.

FIG. 1B is a block diagram of an exemplary computing system 90 which may also be used to implement one or more nodes of a network, and which may operate as an M2M server, gateway, device, or other node in an M2M network. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. The display may include a graphical user interface such as those illustrated in the accompanying figures, and described below in more detail.

Further, computing system 90 may contain communication circuitry, such as for example a network adaptor 97, that may be used to connect computing system 90 to an external communications network to enable the computing system 90 to communicate with other nodes of the network.

Framework

Figure 2:
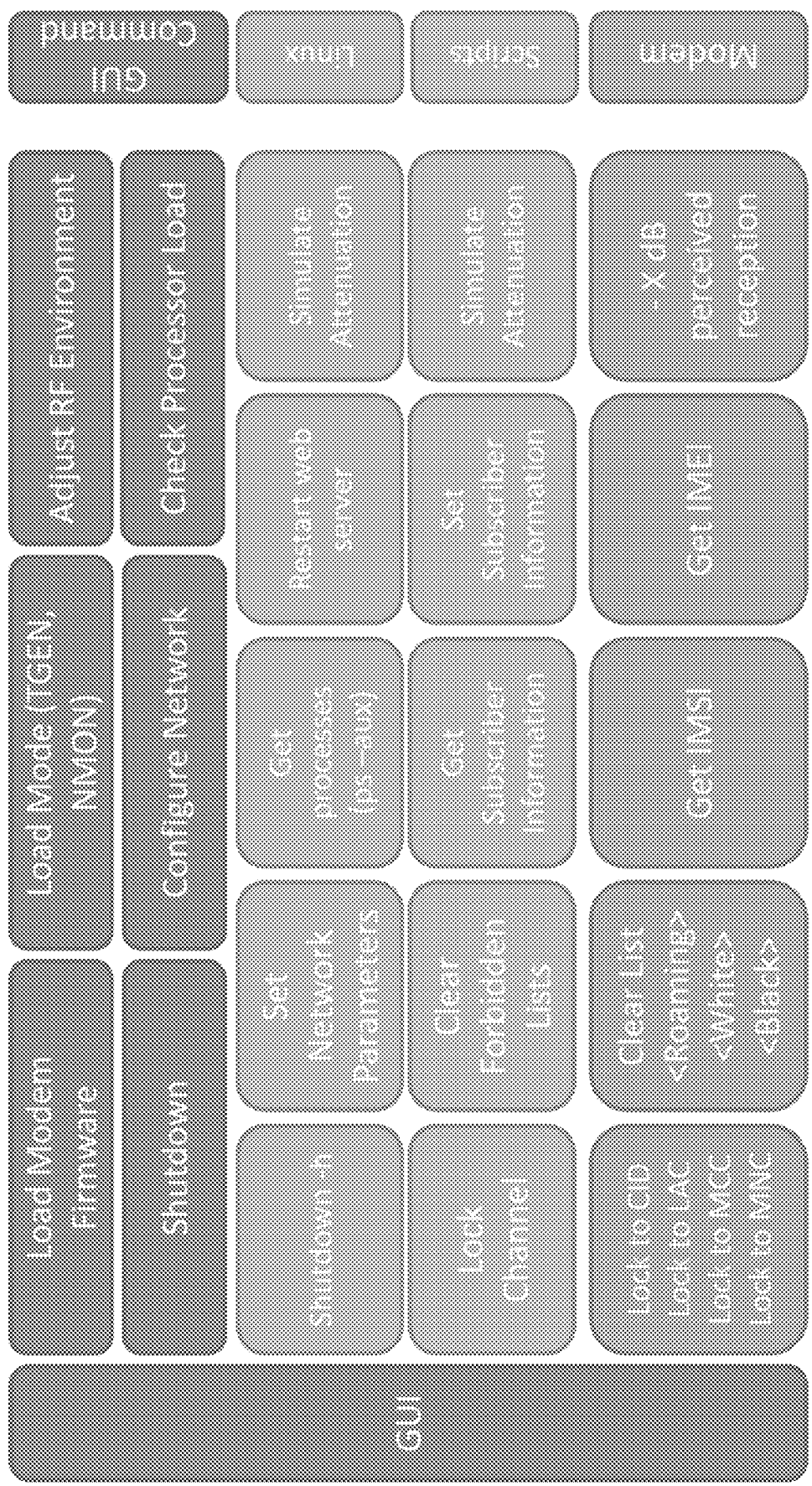
FIG. 2 illustrates software functionality configured on communication system controlled by an application processor for interfacing with radio resources according to an aspect of the application.

According to another aspect of this application, a programmable universal modem architecture (framework) that creates a reliable and reusable communication path between a communication device (modem/GPS/Wi-Fi card) and a user is envisaged. An exemplary embodiment of the framework is illustrated in FIG. 2. The framework provides a modular system upon which new capabilities rapidly can be developed and deployed. In an embodiment, the framework may include a graphical user interface (GUI) from which the user or administrator can view activity for one or more radio resources controlled either locally or remotely. As will be discussed below in more detail, the framework may also receive transmissions from one or more users in a location either off or on a cellular network. In another embodiment, the framework may also communicate with a third party, such as for example a network provider, to perform scanning and testing protocols over one or more slices of a network.

Figure 3:
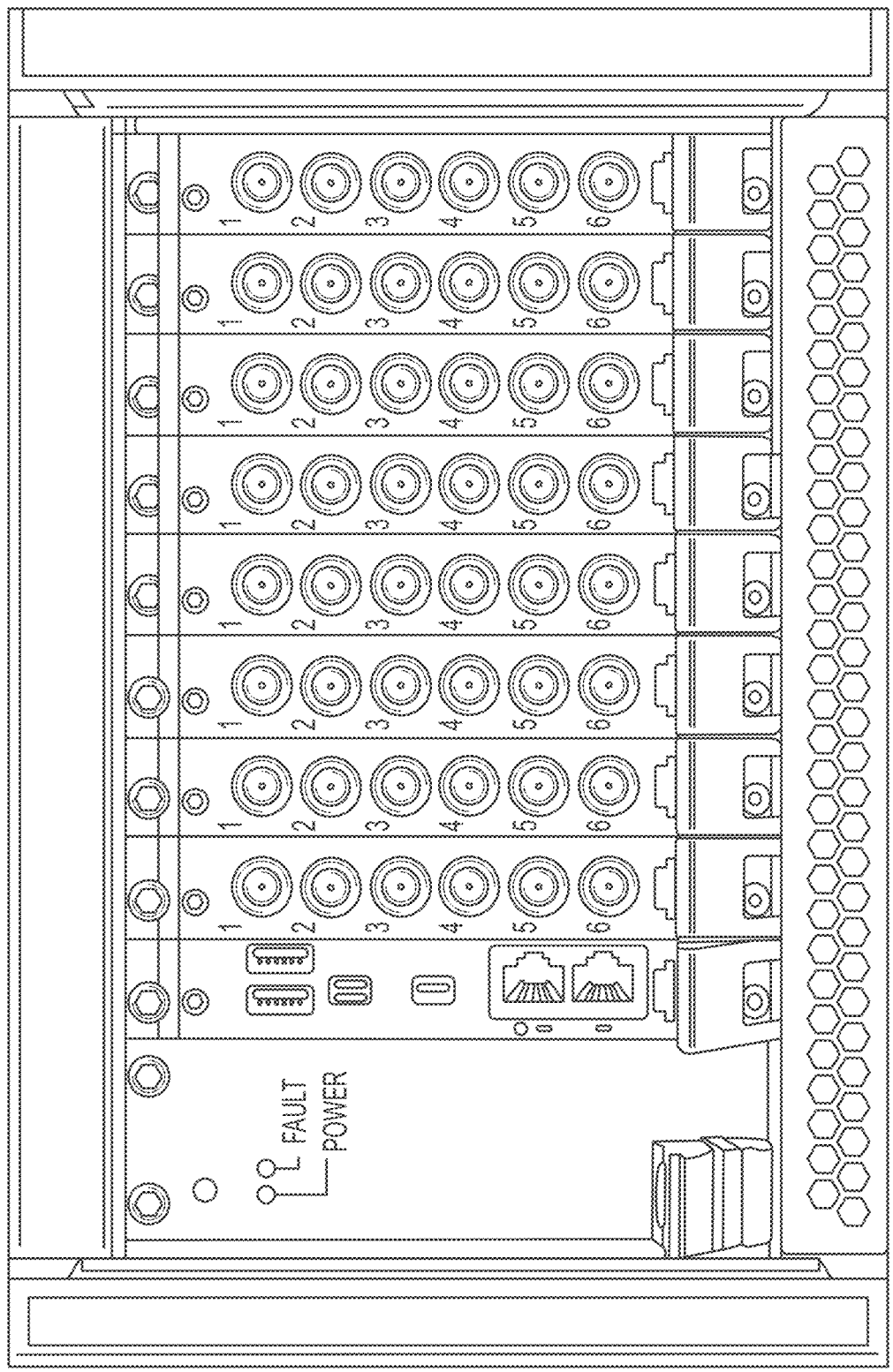
FIG. 3 illustrates an exemplary embodiment of a communication system including plural radio resources.

Generally, the framework performs various functions or batch operations on a bank of N modems. This framework is extensible to support any USB device and envisaged to include Wi-Fi, GPS, SatCom, or an equivalent thereof. The software operating on the framework enables scripting and batch operations on nodes of communications networks. FIG. 3 illustrates an exemplary embodiment of the technology. Here, the framework operates on system whereby a main processor operably communicates with plural, discrete radio resources, e.g., modems. As shown in this embodiment, the main processor and plural radio resources are located on a single, unitary device.

Figure 4:
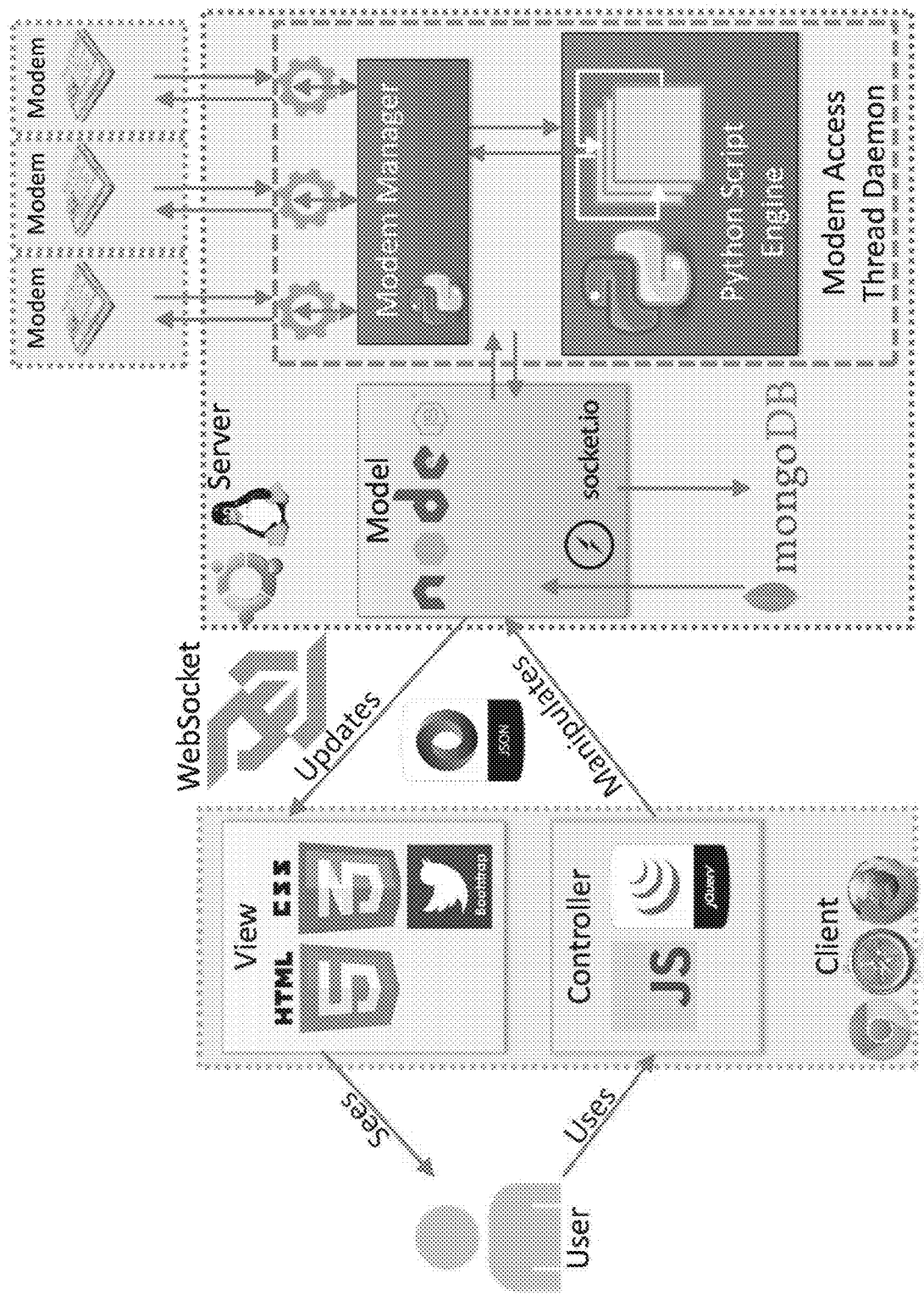
FIG. 4 illustrates a communication system communicating with UE or a third party network provider according to an aspect of the application.

According to another embodiment, the discrete, radio resources can be managed by the main processor including a multi-threaded Python engine which communicates with a Node.js server. As shown in FIG. 4, the Node.js server may communicate with a client or third-party GUI via web sockets that enable the system to customize specific applications. It is envisaged that the core framework may employ multiple open source software packages. In the framework, the foundational components include software such as Python, Linux and Node.js. As will be discussed herein, while radio resource is interchangeably used with the term modem, it is understood the modem is a part of the radio resource that provides the means to modulate and demodulate signals for communication with other radio resources and the network. As a result, radio resources become commoditized in an embodiment of the application and allow for the transfer of data and agnostic control of these resources to create a flexible framework for batch processing and coordinated efforts.

As further shown in FIG. 4, a modem/radio resource manager is located in the modem access thread DAEMON of the server. The modem manager creates an individual process for every modem that is discovered on startup. Each of these processes is given its own TCP port allowing it to be commanded via the combination of the overall system's IP address and port. These ports are maintained in a range and this range must be accessible to all other systems on the same subnet via firewall modifications. An example of a typical setup would be where the system has an IP address of 192.168.0.2 and 16 modems. Each of the modems would be assigned a TCP port between [XXXX and XXXX]. 192.168.0.2:XXXX would be a modem manager listening for commands.

On startup, the system scans the USB bus for available modems and identifies compatible devices via vendor identification (VID) and product identification (PID). The VID and PID of compatible devices are kept in a usb.json file.

Figure 5:
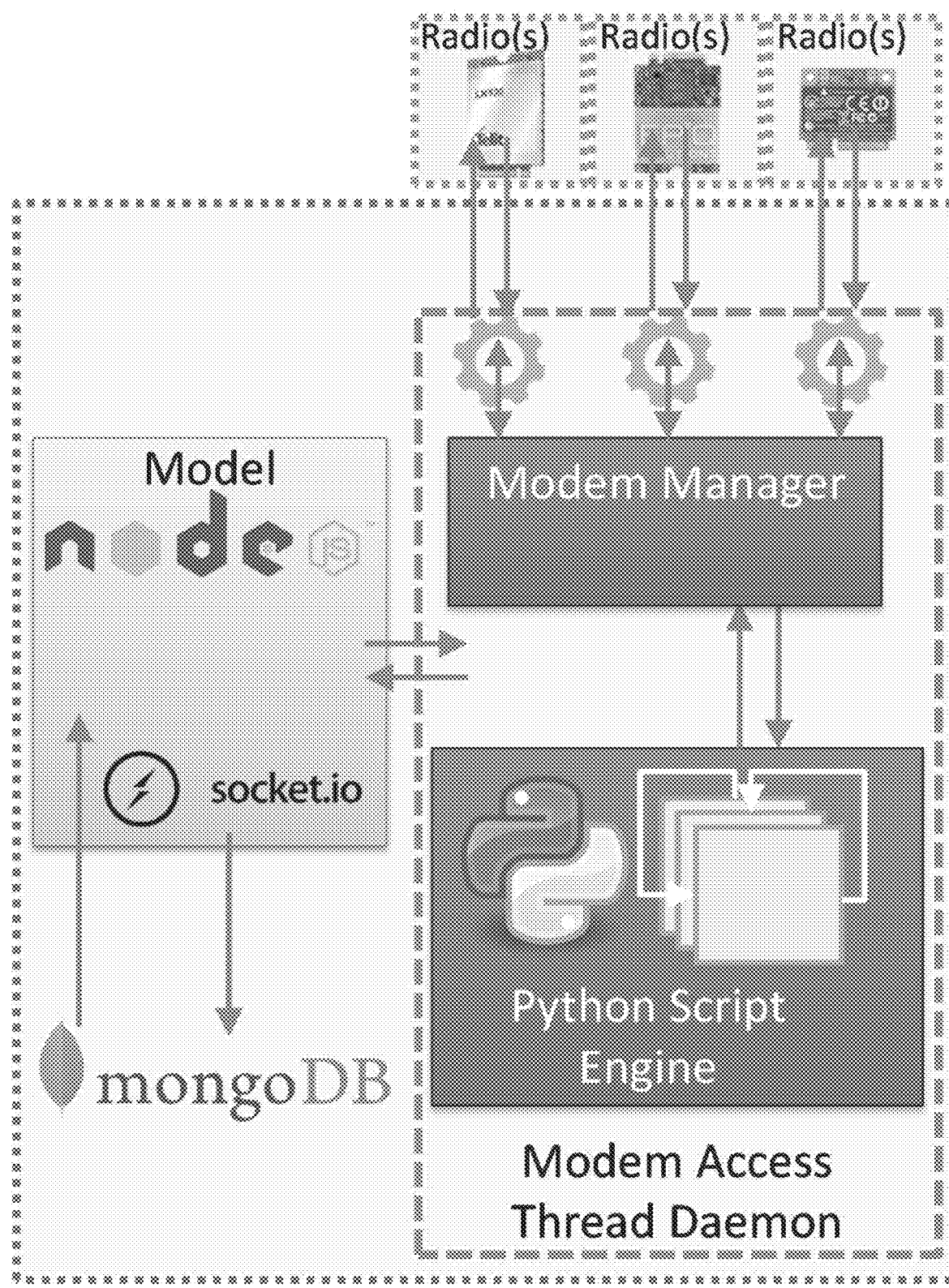
FIG. 5 illustrates the communication system of FIG. 4 interfacing with discrete radio resources of different types.

The modem access thread daemon (MAT Daemon) in the server manages the commands of each of the individual modem manager threads. As shown in FIG. 4, three local modems have been identified on startup. Each modem communicates with the local modem manager. The modems may be part of similar or different radio resources. For instance, as shown in FIG. 5, the modems are part of discrete and different radios. The radios shown in FIG. 5 are exemplary radios that have been or could be integrated into this system. Examples include a Telit LN930 cellular machine-to-machine module which contains multiple internal radios for communicating with GSM, UNITS, and LTE networks. A more flexible example is the Epiq solutions software defined radio (SDR) that can be configured to communicate with many RANs in software. A further example includes a Wi-Fi modem, such as an Intel 8260 wireless AC card or an Atheros Wi-Fi card. One radio may operate on GSM/GPRS, UMTS/HSPA, LTE or GPS. Another radio may be software defined. Yet another radio may operate via Bluetooth.

According to an embodiment, the node.js server of the system also is configured to communicate with the server of other remote systems via JSON messages. Each remote server includes a respective modem manager and modem access thread daemon. Both solicited and unsolicited messages are possible. The node.js.server can create an individualized session for one or more radio resources of the remote server. Once the remote radio resource is authenticated, this session is valid until the tab is closed or alternatively, the page is refreshed. Future session improvements will add the ability for admin users to set a session timeout. These concepts will be discussed in more detail below.

In another embodiment, the system may create one or more default user groups, e.g., admin and standard. These can be added in the modules—module.json file—which can define multiple characteristics for the new user group. All users may be stored in a collection inside the MongoDB.

According to another embodiment, the system relies upon the NoSQL MongoDB project. MongoDB provides a lightweight and rapid mechanism to store data quickly. Retrieval of the data can be time consuming and steps should be taken to only retrieve data from mongo when absolutely necessary. MongoDB can handle massive amounts of parallel writes with little impact to system performance—which is ideal for headless operations. The majority of the framework's applications will spend their time in a headless mode. That is, it only displays data to the user after the intensive operations are completed. All data retrieval operations are secondary to data storage operations.

According to yet another embodiment, the foundational components of the system provide features for managing the bank of modems. Modules provide mission specific tailored functionality. This functionality is managed from a custom GUI framework that provides system management. The core modules of the framework will be discussed below in more detail as well as shown in the drawings. The core module of the framework provides the Dashboard, Navigation, Modem Management, and System Administration. The Raw Serial module allows for the commanding of a USB/PCI endpoint device directly from the GUI via a serial interface. It provides for a history of commands sent, an output of received responses, and an area to directly enter a command to send to the endpoint.

According to a further embodiment, a traffic generator (TGEN) module is provided. TGEN is intended to load test a base station controller and subsequent network subsystem components by using simulated IMSI and IMEI pairs to register and subsequently be rejected in a rapid manner. This enables the measurement of maximum registration rates.

Coordinated Batch Processing

Figure 6:
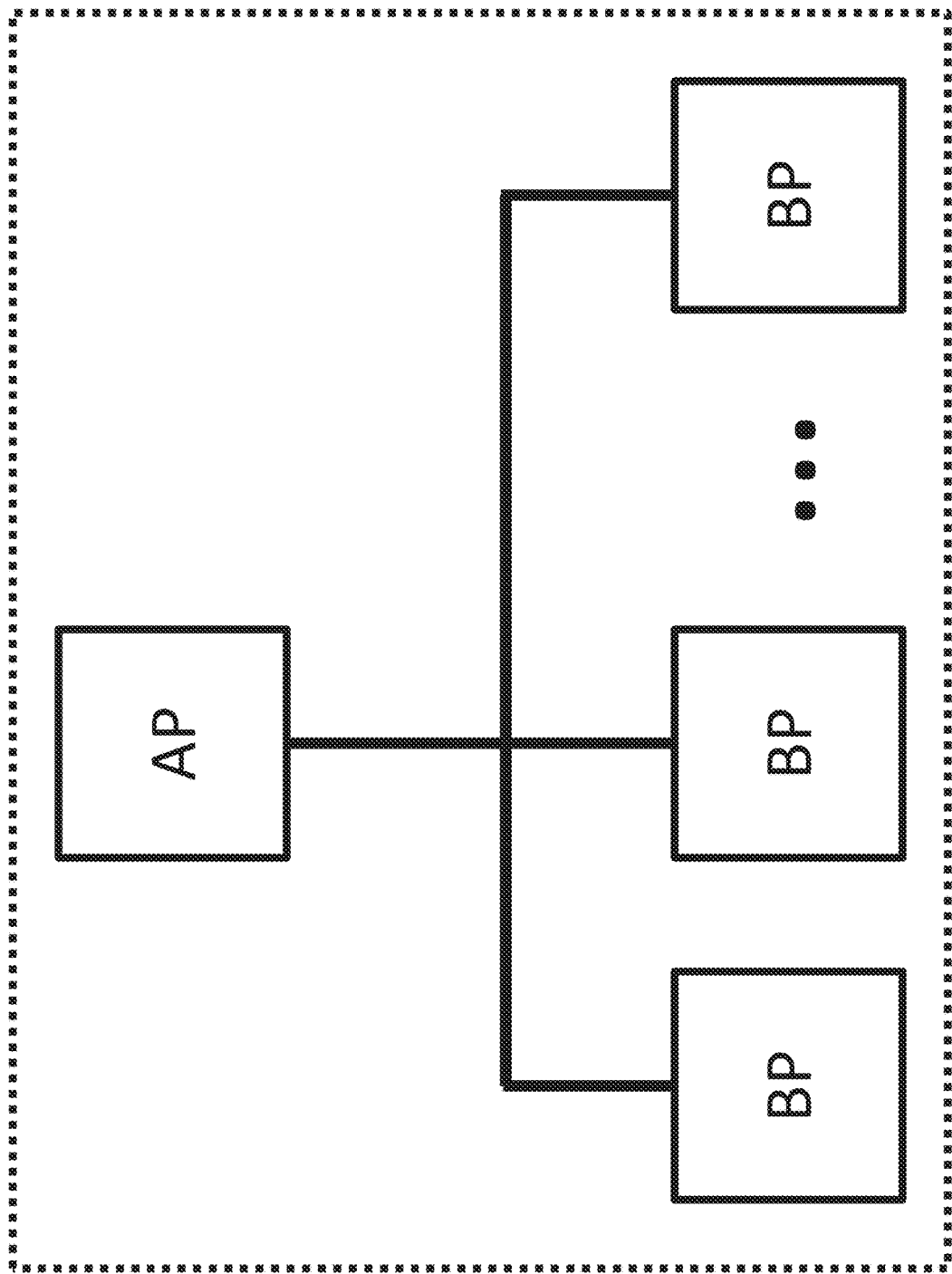
FIG. 6 illustrates an exemplary embodiment of a communication system including a single application processor operably coupled to plural, discrete baseband processors according to an aspect of the application.

According to another aspect of the application, coordinated batch processing of radio resources by an application processor (AP) is described as a tested way to improve communications. Generally, the AP may be associated with 'N' radio resources. This is illustrated in an exemplary embodiment as shown in FIG. 6. Here, an edge router on a network communicates with disparate resources in an environment. The radio resources in this application may include modems (chipsets or chips), cellular basebands, Wi-Fi radio, Bluetooth radio, software defined radio, or any other RFIC/SDR solution that can communicate wirelessly with another peer-to-peer radio, an ad-hoc network, a radio access network (RAN) or similar technology. The radio resources may communicate with 3GPP2 cellular networks such as CDMA, 3GPP cellular networks such as GSM, GPRS, EDGE, WCDMA, LTE, etc., WLANs, WiMAX networks, GPS, Bluetooth, and broadcast networks.

Figure 7:
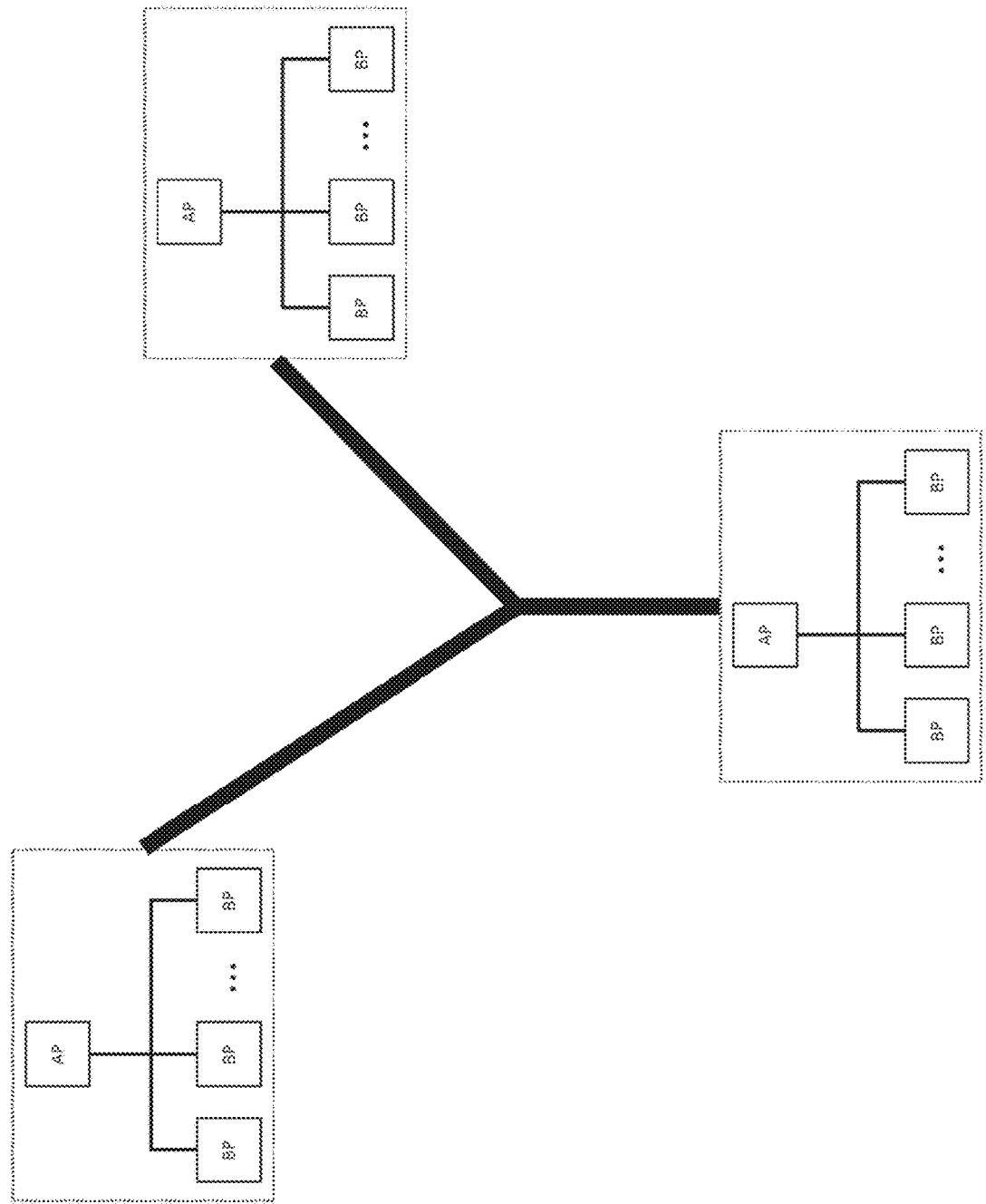
FIG. 7 illustrates multiple communication systems operably in communication with one another to share radio resources according to an aspect of the application.

While FIG. 6 shows a single AP connected to 'N' discrete, radio resources (e.g., bank of modems), FIG. 7 illustrates multiple groups of a singular AP:'N' discrete, radio resources communicating with one another. The AP of each group is capable of coordinating messages among and between the connected radio resources 'N'. As a result, a system of systems is enabled by connecting multiple systems via an application processor network layer linked via an Internet Protocol (IP) or a similar connectivity option.

In an embodiment, the radio resources are assigned routable transport layer ports (via TCP or its equivalent). These may include UDP, UDP-lite, SCTP, DCCP and RUDP. This allows for a multi-system coordinated network across any supported spectrum with systems in potentially geospatially diverse systems, via the bridges and gateways connecting physically enabled radio areas, peer-to-peers, ad-hocs, or similar wireless networks and disparately enabled systems. The system allows for a rapidly reusable reference architecture whereby data is efficiently routed from cellular to cellular, cellular to Wi-Fi, or similar. In some aspects, coordinated network loading on resource-limited links is also envisaged according to this application.

In another embodiment, the radio resources are treated as an agnostic, capability bound, component that can be dynamically assigned tasks based on application layer tasking. This application is envisaged to work in layers 3, 4 and 5. For instance, a RAN system test may incorporate testing filtering for bad message types, and gather information on response latency or network timing. This can allow for testing of edge cases that may not be encountered until after system deployment and loading.

Figure 8:
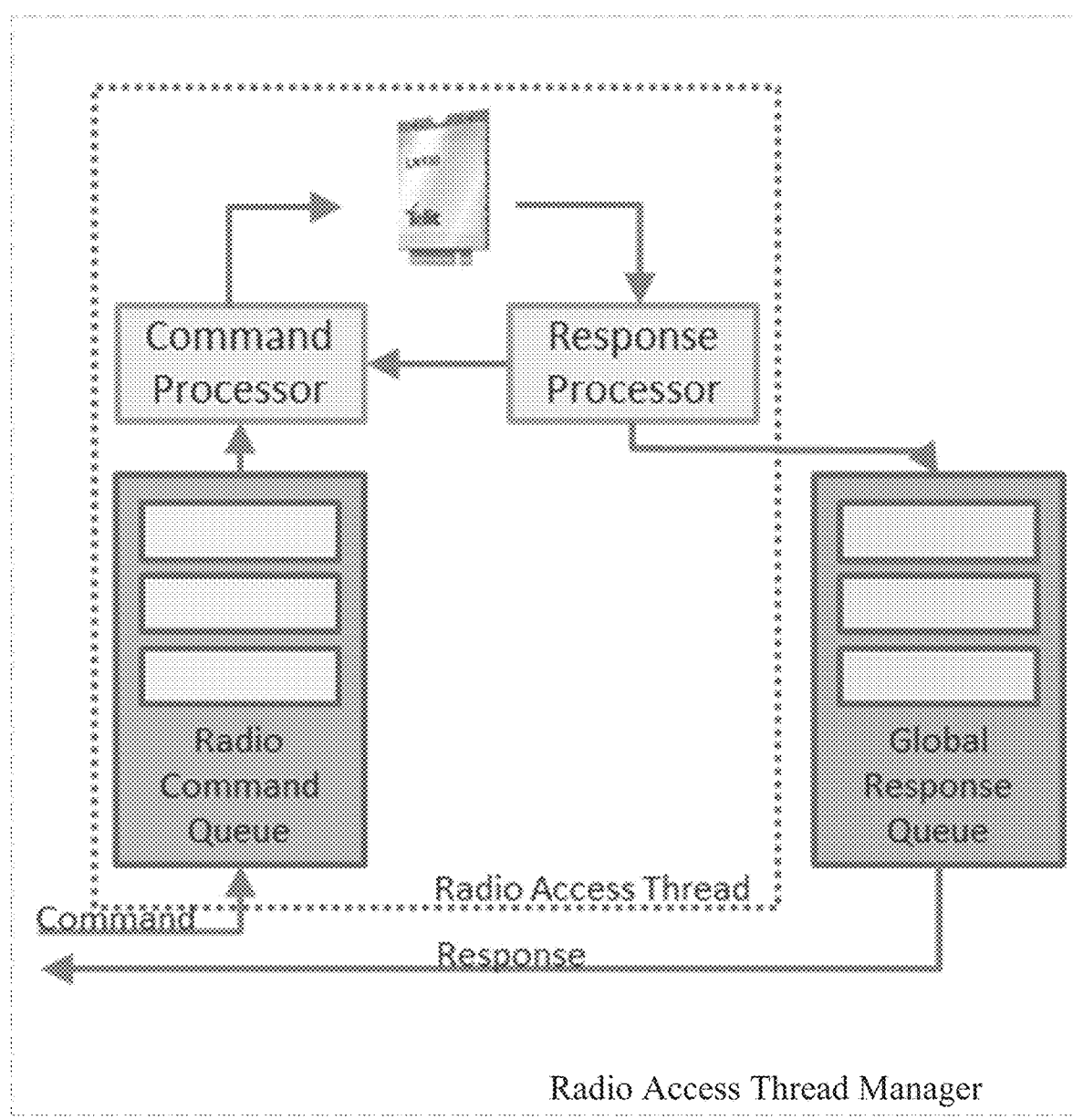
FIG. 8 illustrates a radio command queue and global response queue of the communication system.

FIG. 8 is an exemplary embodiment illustrating a command received by a radio access thread manager. In particular, the radio access thread manager includes a radio manager. The radio manager creates an individual process for every radio resource discovered upon startup. Each process is given its own TCP port. This allows each radio resource to be commanded, either locally or remotely, via the system's IP address and its TCP port.

The radio access thread manager also includes a Radio Access Thread (RAT) Daemon. The RAT Daemon manages commands for each thread with a radio resource created by the radio manager.

As shown in FIG. 8, the radio manager receives a command or request from an external source. This external source may be a UE, a client or an application processor on a server of a remote system. As illustrated, a command is received by the radio access thread manager of the local AP. The command is deposited into a 'Radio Command Queue'. The command is subsequently processed and sent to a specified radio resource. In an alternative embodiment, the command may be randomly sent to the first available radio resource.

The radio resource receives the command in a next step, and sends a confirmation response to the radio manager. Generally, the radio resource indicates that it has accepted the command. If the radio resource does not accept the command, the command may be returned to the command processor of the radio manager for dissemination to another radio resource.

The radio manager sends a response from its response processor to a global response queue in the radio access thread manager. The global response queue may include statuses from both local and remotely located radios on other systems. By so doing, the application processor is able to manage disparate resources over multiple systems. A greater objective is observed whereby a modem with maximum availability can perform the task sent by an administrator.

Limited Network Connectivity

According to an aspect of the application, limited connectivity areas are disparately located all over the United States and other regions of the world. Indeed, these areas may be in well-known areas of limited cellular coverage such as between mountains, and in the desert or woods. Limited connectivity areas may also exist in or around areas having cellular towers. These areas may experience a greater number of cellular requests from users directed at a particular tower.

In areas experiencing such limited connectivity, voice communications typically have been conducted on narrowband analog radio channels, such as for example, walkie-talkies (P2P) and citizen's hand radios. Citizen's band radio services are defined by the Federal Communications Commission regulations and include family radio service (FRS) and general mobile radio service (GMRS) operating at 462 and 467 MHz, Citizen's band radio services also include multi-use radio service (S IRS) operating at 150 MHz. New techniques for receiving and sending encrypted communications via voice, chat, cellular or SMS are envisaged to extend the network to areas having limited or no connectivity.

Figure 9:
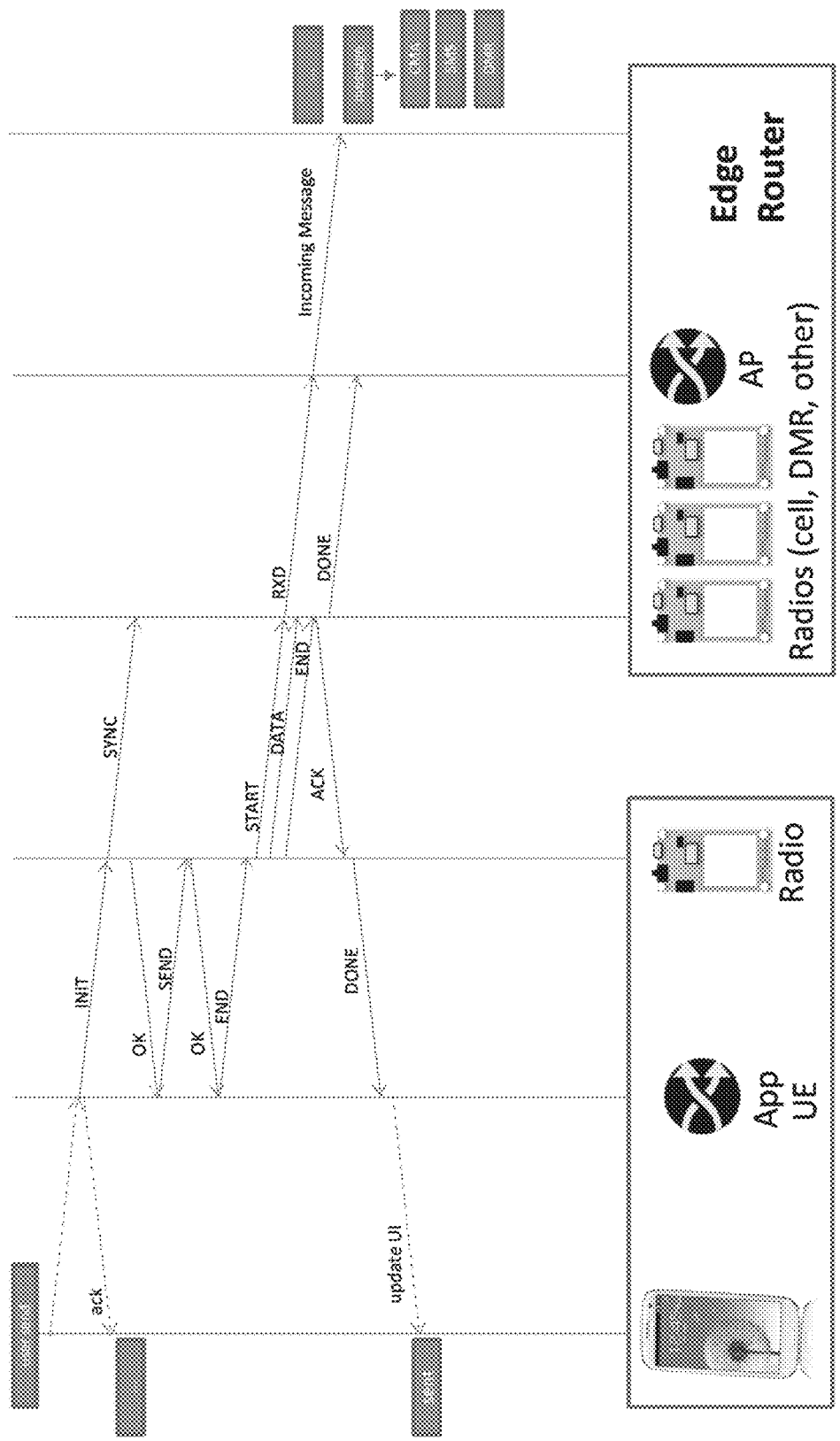
FIG. 9 illustrates protocols for UE in the field to communicate with the communication system according to an aspect of the application.

FIG. 9 illustrates an exemplary call flow describing communications between user equipment (UE) and an edge router. The edge router includes an application processor and plural, discrete radio resources. As shown, the radio resources operate on cellular, DMR, LoRA, etc. In an embodiment, the radio resources operate in at least two of cellular, DMR or LoRA. In a further embodiment, the radio resources operate in at all three of cellular, DMR and LoRA.

LoRa is a proprietary, chirp spread spectrum (CSS) radio modulation technology for low power wide area network (LPWAN) used by LoRaWAN, Haystack Technologies, and Symphony Link. LoRa uses license-free sub Gigahertz radio frequency bands like 169 MHz, 433 MHz, 868 MHz (Europe) and 915 MHz (North America). LoRaWAN is an open LPWAN data link standard maintained by the LoRa Alliance. In the OSI stack model, LoRaWAN would correspond to the Media access control (MAC) layer.

The Digital Mobile Radio (DMR) standard is a European private network communication standard issued by ETSI (European Telecommunications Standards Institute) for taking place of the analog Private Mobile Radio (PMR). DMR is advantageous in large coverage area, high transmission rate, high spectrum efficiency and excellent energy-saving efficiency. DMR uses a Time Division Multiple Access (TDMA) frame structure with double time slot.

A trunked radio system is two-way radio system that uses a control channel to automatically direct radio traffic. Two-way radio systems are either trunked or conventional, where conventional is manually directed by the radio user. Trunking is a more automated and complex radio system, but provides the benefits of less user intervention to operate the radio and greater spectral efficiency with large numbers of users. Instead of assigning, for example, a radio channel to one particular organization at a time, users are instead assigned to a logical grouping, a "talk group". When any user in that group wishes to converse with another user in the talkgroup, a vacant radio channel is found automatically by the system and the conversation takes place on that channel. Many unrelated conversations can occur on a channel, making use of the otherwise idle time between conversations. Each radio transceiver contains a microcomputer to control it. A control channel coordinates all the activity of the radios in the system. The control channel computer sends packets of data to enable one talkgroup to talk together, regardless of frequency. The primary purpose of this type of system is efficiency. Many people can carry many conversations over only a few distinct frequencies. Trunking is used by many government entities to provide two-way communication for fire departments, police and other municipal services, who all share spectrum allocated to a city, county, or other entity.

In another embodiment, the system can transmit data to a network. The data may be rich. The system can receive, process, and relay data between multiple radio technologies including multimedia information. The content relayed and processed is limited only by the bandwidth available in a given technology. It is envisaged the data may be transmitted over a specific ISM band. An exemplary frequency of the ISI band is 900 MHz.

The UE includes a display upon which an application can be accessed via a graphical user interface (GUI). The UE also includes a radio (e.g., modem) to communicate with one of the radio resources of the edge router. In this use case, the UE is located in a predefined area with limited network connectivity. In an exemplary use case, there is no network connectivity in the predefine area.

It is assumed in this example that the UE has downloaded an application to interface with the edge router. More particularly, the application was downloaded while the LTE was connected to a network. Initially, the application may initialize itself with the radio in the UE. Either concurrently or subsequently thereafter, the radio in the UE synchronizes itself with a radio of the edge router. The radio of the UE sends a request to the radio of the edge router. In turn, the radio of the edge router forwards the request to the application processor. The edge router may evaluate the type of message in the received request. The message may be in the form of a chat from a commercial messaging application (CMA), SMS, or in voice format. Then, the edge router sends a reply to the radio on the UE which ultimately updates the user interface.

In a further embodiment, the application processor is configured to close an individualized session created for one of the modems associated with the UE. This can occur when the application/UE has moved out of a predetermined area or has been actively disabled by the UE.

According to another embodiment, the application processor may conduct a scan of UE in a predetermined area with little or no network connectivity. The scan may be based upon a last known address of the mobile equipment during a period of network connectivity. In an embodiment, the last known address could be obtained via a ping from another UE that is connected to the edge router. It is envisaged that the application processor of an edge router may also scan a location for another edge router. By so doing, the application processor may be able to extend the search in areas of limited or no connectivity.

Figure 10:
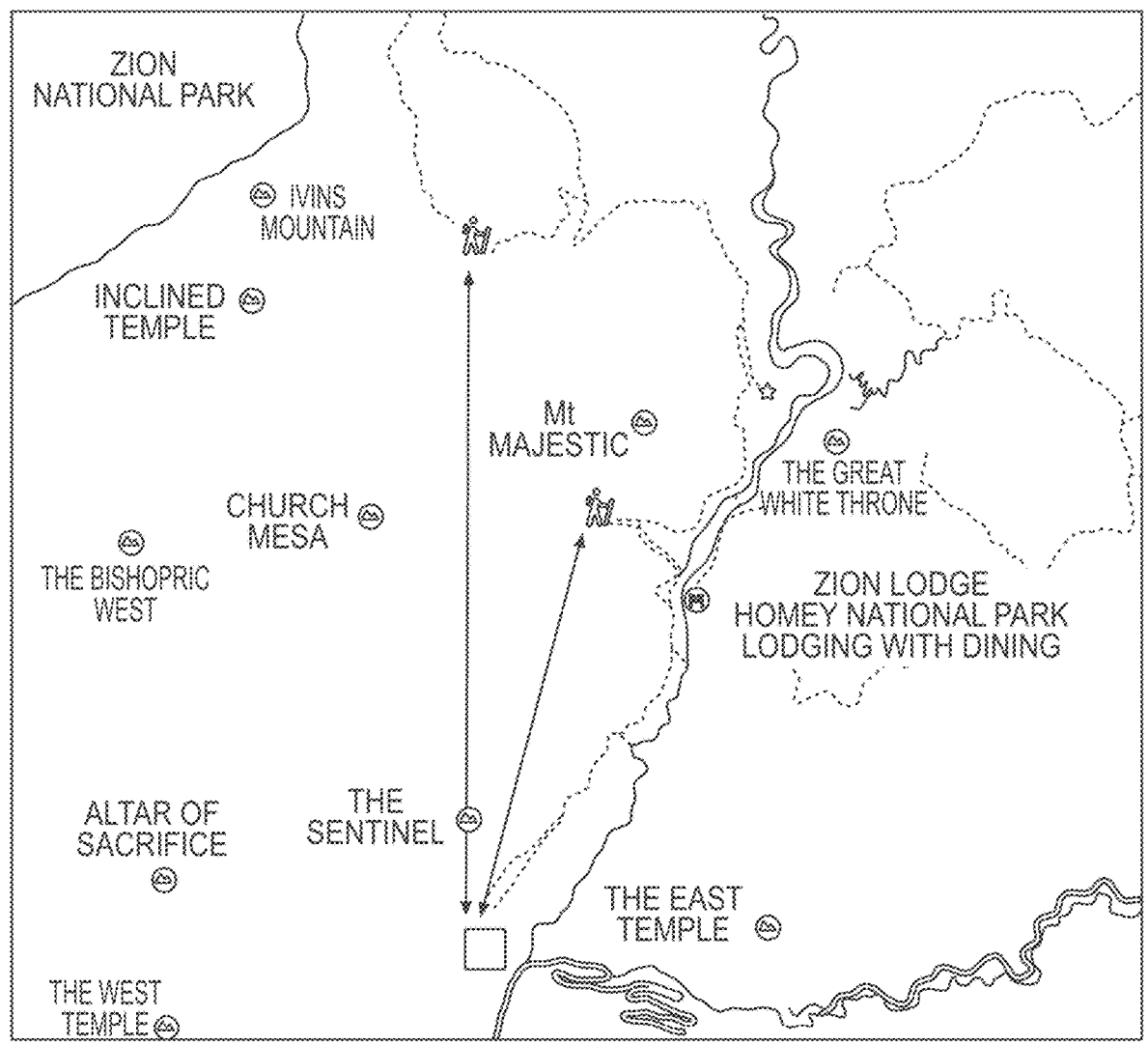
FIG. 10 illustrates an exemplary embodiment of UE shown in FIG. 9 associated with hikers in areas of limited or no connectivity that communicate with the communication system.

In the deployment illustrated in FIG. 10, the configurable radio solution can act as an edge gateway for remote hikers without cellular service. This may create a gateway to wider area networks (cellular), or more metro area networks (MAN) such as DMR or P25 trunked mobile systems to alert rangers. The gateway in this scenario includes multiple P2P radios integrated to either a NPS Trunked Mobile system or to an internet/cellular text-based system. This could be Cellular, SMS or CMA, such as for example, WhatsApp, Google Hangouts, or Viber. The radios may also be LoRa-enabled. That is, Low Power Wide Area Network (LPWAN) for wireless battery operated things in a regional, national or global network. Lora includes bi-directional communication, mobility and localization services. Communications between the UE and gateway is spread out on different frequency channels and data rates.

As shown in FIG. 10, an edge router (e.g., square) may be located in an area with limited or no connectivity. For example, the area may be a national park. The one or more UEs (e.g., hikers) may be configured with emergency services and/or a cellular/wired backhaul to connect with other UEs. In this scenario, an individual with a point-to-point or LAN technology-enabled Mobile Station (MS) or UE is able to maintain connectivity with emergency services or contacts via the edge gateway router.

The communication flow for a remote hiker may include and is not limited to the following protocols discussed below. The hiker could register with the network policy server (NPS) of a preferred gateway protocol. For instance, a side-channel approach allows for a user to register their preferred NPS technology. All received messages would be relayed to that individual. Similarly, a specific message header could be used to direct messages to that park's emergency services. The adaptation of the multi-radio architecture extends these capabilities. Where LoRa specifies a generic 3G, Ethernet, or Wi-Fi service, the multi-radio architecture of this application allows for multiple data capable backhauls to extend the cellular network. It also extends the state of the art by acting as a technology gateway among different WAN technologies, including for example, LoRa to CMA and LoRA to SMS. Indeed, one radio may receive an input, via LoRa, and another radio resource may transmit an output via CMA.

According to yet another embodiment, the system includes a single application processor operably coupled to multiple, discrete radio resources each including a modem. The system is configured to communicate with one or more UEs positioned at a location with limited connectivity. The system is configured to execute instructions of determining that the UE has a registered application. As discussed above, registration occurs when there is some network connectivity. The system may receive a request from the UE to access a network. The network may be a cellular network. The request may be sent by the system to the cellular network. The system may receive a reply from the cellular network. The reply may be in SMS or CMA format. The received reply from the cellular network may be forwarded to the UE.

According to yet another embodiment, the UE may wish to communicate with another UE in the area having limited connectivity. The communication may include rich data transmission over a CMA format. The communication may also be in a SMS format. The UE obtain a request from the UE and subsequently send the communication to the other UE.

According to even another embodiment, an Application or App is provided on a display of a UE for allowing a user to communicate with the system. The App is manipulated via a GUI. An example of the UE including the APP is illustrated in FIG. 4. It is presumed that the user has downloaded the App on the UE prior to entering a location with limited or no network connectivity. The App may be used to communicate with the system acting as an edge router ultimately to send/receive messages or use network (e.g., cellular network) resources to browse the internet.

In an alternative embodiment, the UE may obtain a request from the communication system seeking permission to initiate a session. The request may be received during a scanning activity of the communication system to identify all UEs in a predetermined location. This is particularly useful in locations such as the mountains or desert.

Overloaded Network Gateway

In another aspect of the application, instances may arise where a cellular network becomes overloaded. This may be caused by a saturation of UEs in a small area attempting to send or receive requests from a cell tower. As a result, the quality of circuit-switched and packet-switched services is dramatically reduced. While DMR/Trunked Mobile provides voice capabilities, conventional services limit rich data transmission.

As will be used herein, the term "overloaded" implies the number or amount of requests, tasks, or data generated or input for a specific network entity is larger than that of requests, tasks, or data that can be processed. Moreover, "overloaded" and "congested" may also have similar meanings in the context of this application.

In an embodiment regarding overloaded networks, upwards of 1 million individuals may pack the DC area for various demonstrations or parades. Similar to other high-traffic public places such as State Capitols, the cellular infrastructure may become severely overloaded. While public servants such as policemen and firemen have discrete access to VHF and UHF bands, rich forms of communication are not available to them. Most P25 and PTT applications are simplex communications and do not permit rapid sharing of information in dynamic environments. Additionally, conventional radios have high observability and may draw unwanted attention. Using a relay technology will allow for standard communications and the transfer of the load outside of the congested area.

Moreover, general users of UEs desire options to communicate with other users in an area even when network connectivity is overloaded. The current architecture overlays additional capabilities with alternative peer-to-peer and mesh network topologies into a robust framework. For examples, the multi-radio resource solution includes services such as local caching, geospatial awareness, inter-technology routing (e.g. between cellular and Lora), local processing (e.g., object classification to send information over constrained links), and spectrum monitoring.

In an embodiment, the multi-radio resource topology allows for connections to multiple end-users. The topology can also bridge different wireless wide area networks (WAN) technologies, such as LTE and LoRa. The single AP to multiple radio resources allows for the management of data flow among multiple clients. The multi-radio resource topologies include architecture described above and as illustrated in FIGS. 1A and 1B. The inter-gateway links can also be formed using a radio (e.g., microwave, cellular, VPN or Wi-Fi).

Figure 11:
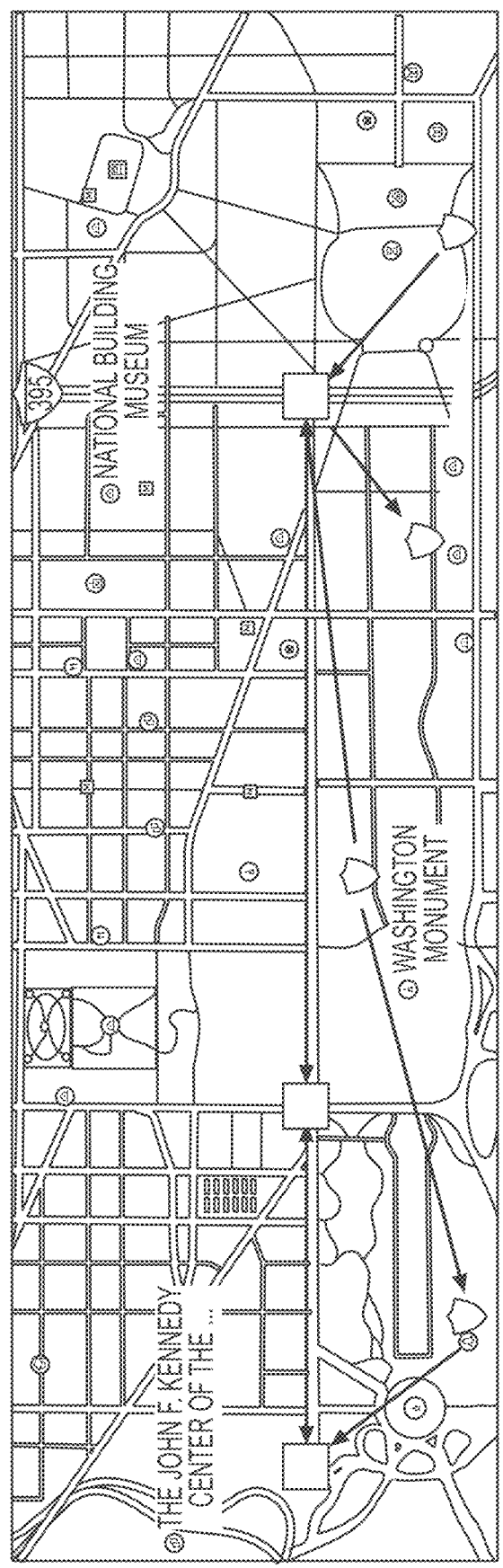
FIG. 11 illustrates plural communication systems in communication with each other to share radio resources according to an aspect of the application.

As shown in an exemplary embodiment in FIG. 11, edge routers are denoted by squares in the map. The squares are placed at predetermined areas of interest. In some scenarios they may be evenly spaced. In alternative scenarios they may be organized by the quantity of users in a location. The communication between separate edge routers including modem banks was discussed above in regard to FIG. 7. In reference to FIG. 11, the shield-shaped symbols are indicative of UEs in the area trying to communicate with one another. Each UE is connected to a radio resource of one of the three edge routers in FIG. 11. Specifically, the three edge routers shown in FIG. 11 share information governing their respective capacities. Indeed, they act in harmony for a higher purpose. An application processor of one edge router may be able to control radio resources of another edge router. By so doing, resources can be pooled to ensure users are able to effectively communicate to one another.

In an embodiment of this aspect, a communication system in an overloaded network is described including a first edge router. The edge router includes a single application processor operably coupled to a local group of discrete radio subsystems. Each of the radio resources includes one or more modems. The single application processor of the first edge router is configured to execute the instructions of receiving a request from a first mobile equipment to communicate with a second mobile equipment in the congested network. Here the mobile equipment may be a wireless device, such as a smartphone, wearable technology or tablet. The single application processor of the first edge router is also configured to execute the instructions of checking capacity of the local group of radio resources. The capacity may involve determining the number of protocols each radio resource is handling.

The single application processor is also configured to execute the instructions of sending a capacity request for information to a second, remote edge router in the overloaded network. The second edge router also includes a single application processor and a local group of discrete radio resources. Each of the radio resources includes a modem. It is noted that the number of radio resources in each edge router may be different.

Figure 12:
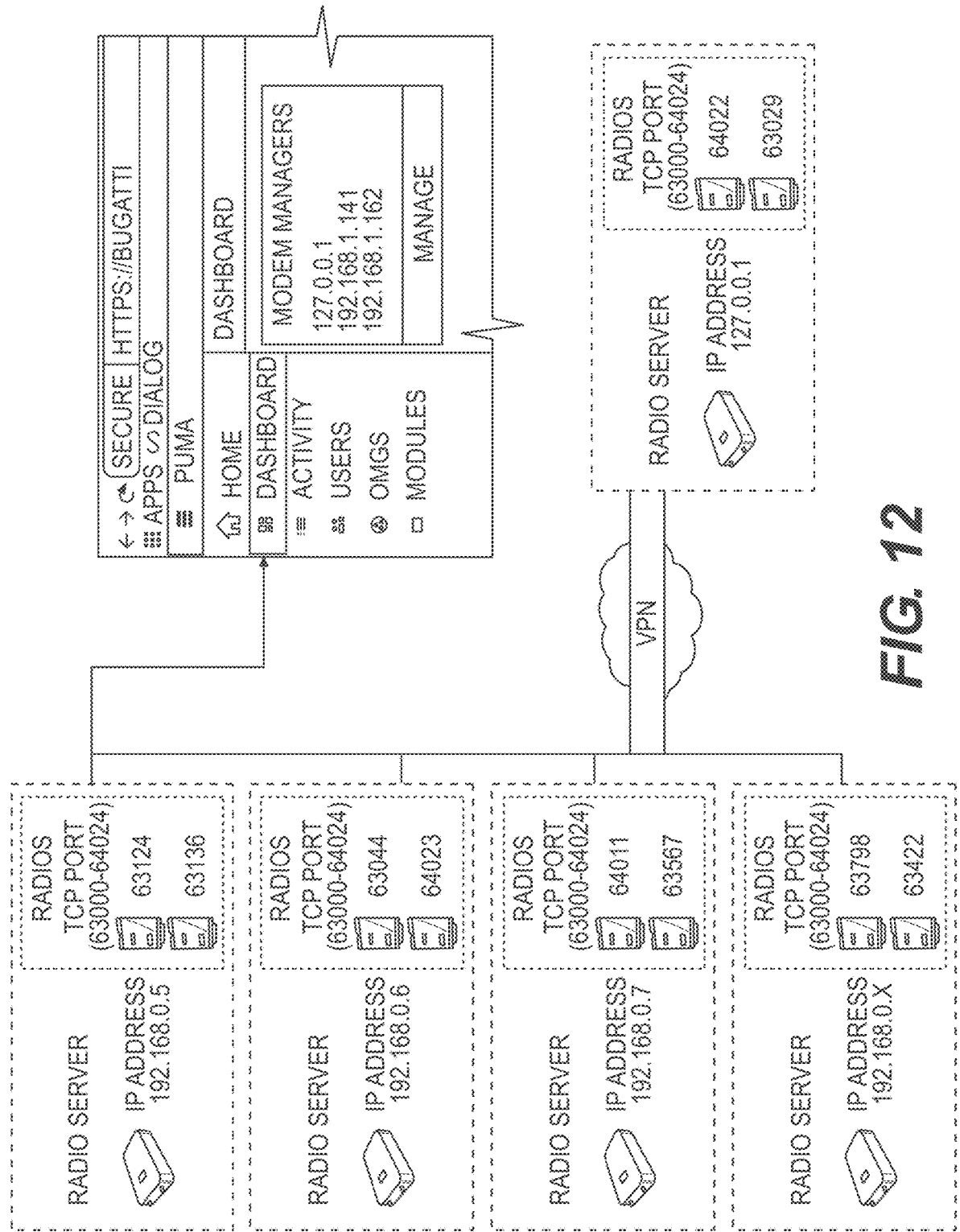
FIG. 12 illustrates plural communication systems having radio resources being evaluated and controlled by one of the communication systems.

In a further embodiment, the first edge router is configured to execute the instructions of receiving the information from the second edge router. The information may include, for example, an availability of one or more available radio resources s in the second edge router. The first edge router then determines which one of the radio resources of the local group of the first and second edge routers can effectively handle the request from the first mobile equipment. For example, as illustrated in FIG. 12, the radio server, e.g., edge router, with an IP address of 127.0.0.1 is considered the first edge router. The first edge router includes plural radio resources. These radio resources are considered local radio resources, Meanwhile, four radio servers with IP addresses of 192.168.0.5, 192.168.0.6, 192.168.0.7 and 192.168.0.X describe the second and subsequent edge routers in the architecture. Each of these edge routers has plural, discrete radio resources. These radio resources are considered remote radio resources. The information may also include capacity of the modems of the radio resources in the first and second groups.

The first edge router includes a GUI displaying a dashboard of activity in the architecture. This was shown and described above in FIG. 4. Each of the edge routers includes an independent GUI for monitoring activity. The GUI also provides functionality for managing the respective edge routers listed under the "Modem Managers" tab.

In a further embodiment, the first edge router assigns one of the available radio resources to reply to the request from the first UE. All radio resources are pooled together and utilized to ensure requests from users are adequately handled. Subsequently, the message from the first UE may be sent to a second UE. The second UE would also be associated with a local or remote radio resource in the network. In one embodiment, the request from the first UE may be over a first communication path. The communication to the second UE may be in the same or different communication path. The communication paths chosen by the radio resources include one or more of LoRA, DMR, Wi-Fi and cellular.

According to yet another embodiment, the radio resources may be reassigned according to the edge router's assessment of capacity. It is envisaged in this application that reassignment may be achieved in real-time. This concept will be described in more detail below.

According to yet even a further embodiment, the radio resource may be configured to perform local caching. This may be applicable if or when the UE goes out of range from the edge router or network. The local caching can save data from neighboring peers or save its own messages until within range of the edge router In another aspect of the application, a communication system is envisaged including a first and second edge router. The first edge router includes a single application processor operably coupled to a local group of discrete radio resources each including a modem. The second edge router includes a single application processor operably coupled to a local group of discrete radio resources each including a modem in a congested network. The first edge router is configured to control the local group of discrete radio resources of the second edge router. In another embodiment, the second edge router is configured to control the local group of discrete radio resources of the first edge router. This was shown and described above, for example, in FIG. 6.

The first edge router may also be configured determine information of one or more of the radio resources of the local group of the first and second edge routers to handle the request of the user equipment. The information includes availability of one or more available modems of radio resources in the second edge router. The information may include capacity of the modems in the first and second local groups. After the determining instruction, one of the radio resources may be assigned by the first edge router to handle the request.

The communication system includes a communication path of the radio resources may be selected from LoRA, DMR and cellular. The communication system also describes a first edge router reassigning the request based upon a review of capacity of the radio resources.

In yet another aspect of the application, a method for controlling communication in a network is envisaged. The method includes a step of providing a first edge router including a single application processor operably coupled to a local group of discrete radio resources. The method also includes a step of receiving a request from a first user equipment to communicate with a second user equipment. The method also includes a step of checking capacity of the local group of radio resources. The method further includes a step of sending a request for capacity to a second, remote edge router including a single application processor and a local group of discrete radio resources. In an embodiment, the method includes a step of receiving the information from the second edge router. The first edge router may also determine one or more of the radio resources of the local group of the first and second edge routers to handle the request from the first user equipment. In a further embodiment, the first edge router may perform the step of assigning one of the available radio resources to reply to the request from the first user equipment. Subsequently, it may send the communication to the second user equipment via the assigned, available radio resource.

Network Scanning and Testing

According to yet another aspect of this application, it is envisaged that the ability to manage multiple radio resources associated with one or more application processors allows for a distributed and optimized network analytics tool. The technology may work on cellular, Wi-Fi and 802.11 wireless networks. It may also be extended to other wireless technologies with persistent and broadcast carriers. These geographically distributed radios resources including modems can be made location aware with attached GPS to undergo coordinated network surveys for deeper analysis.

Figure 13:
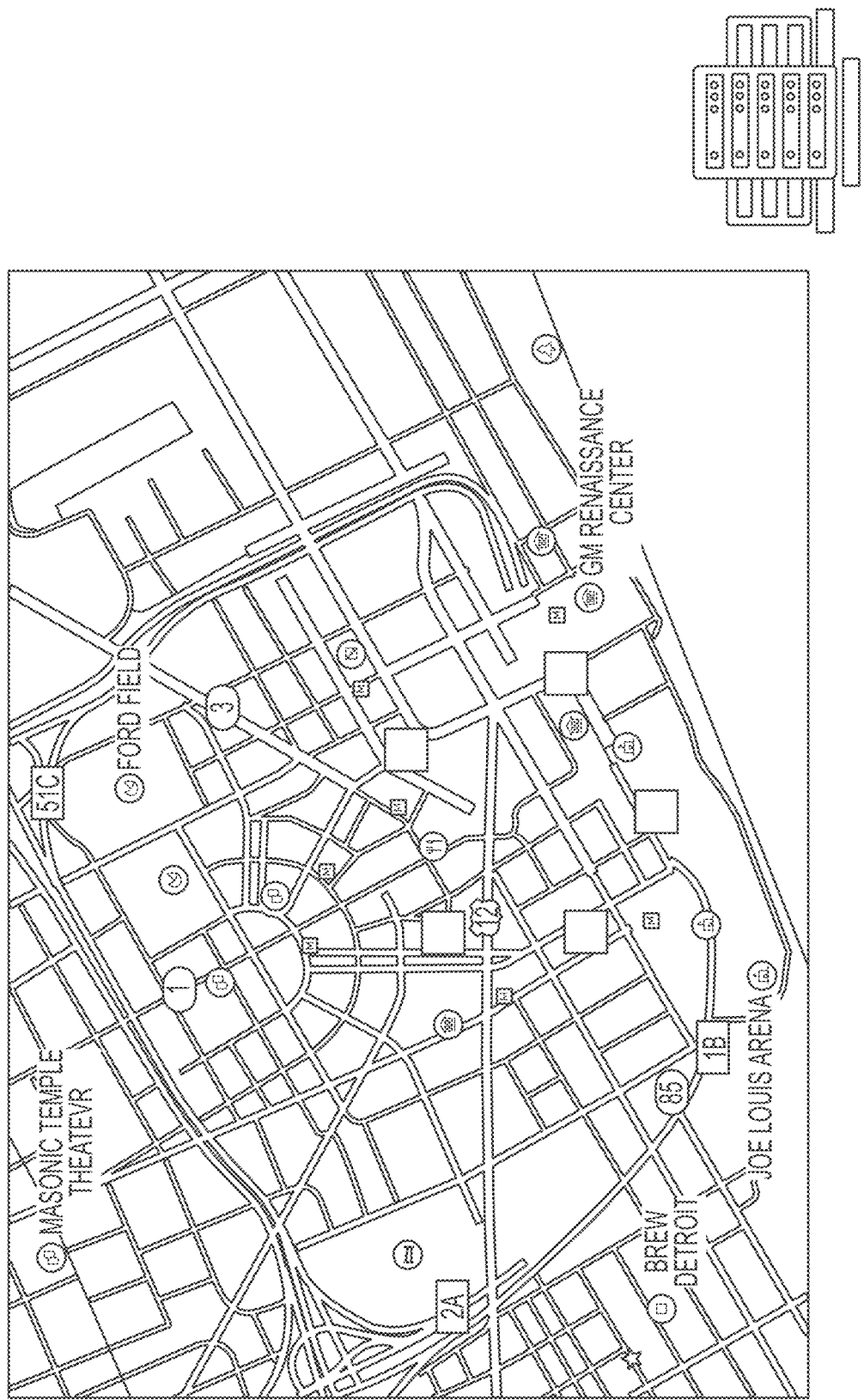
FIG. 13 illustrates plural communication systems in an area that monitor usage to share with a third party according to an aspect of the application.

FIG. 13 illustrates multiple communication systems in a location that is made location-aware. One or more of the systems can communicate with a third party. The third party may be a network provider or other vendor wishing to obtain information regarding network throughput. The obtained information on temporarily or permanently deployed systems can be used to help monitor a spectrum for misuse and identify cell 'breathing'. The information may also be used to run data throughput tests to help identify an overloaded BSC or MSC. Each of the communication systems in FIG. 13 is denoted by a square. These communication systems can communicate with the third party consumer as illustrated by the server to the right of the map.

Figure 14:
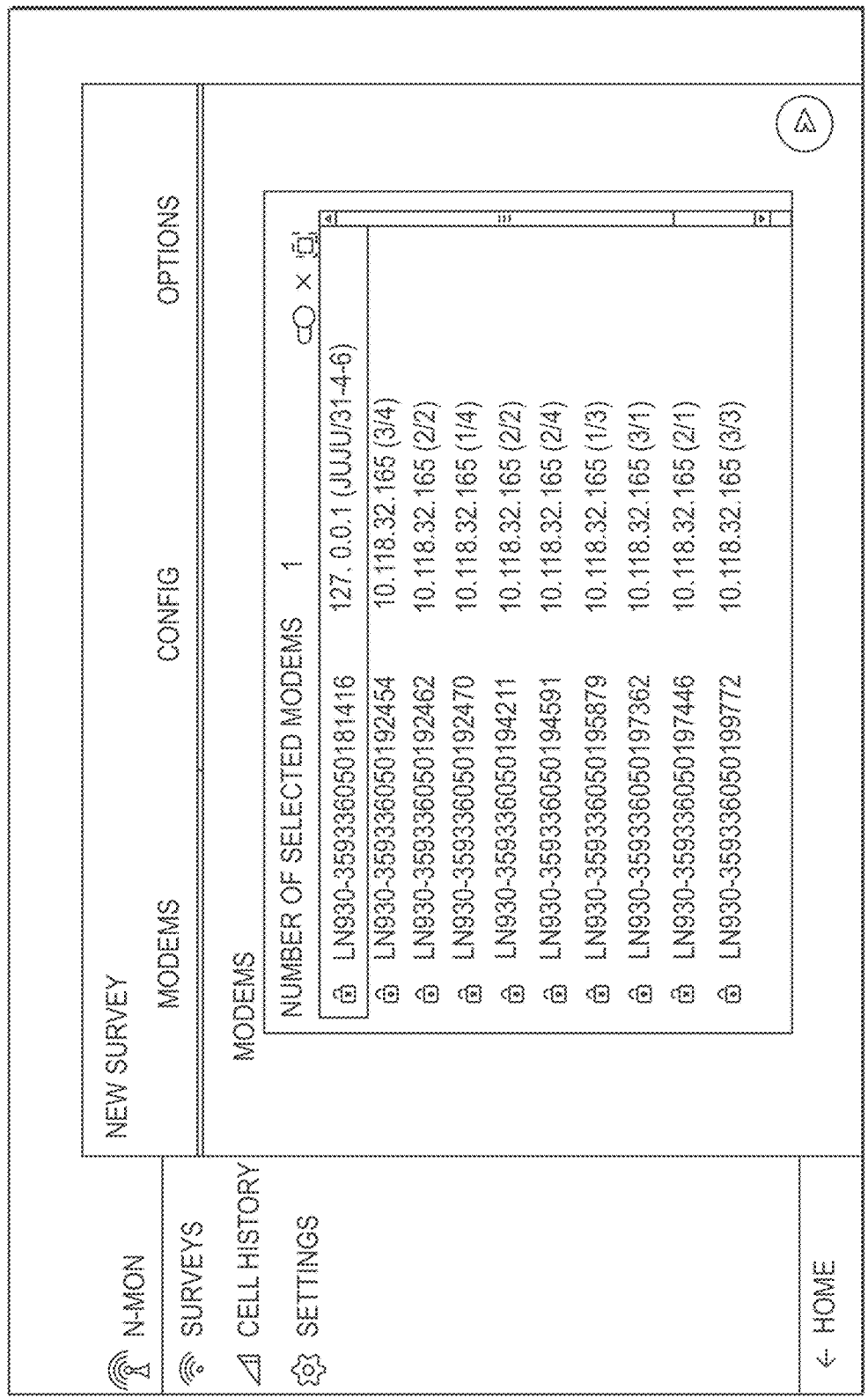
FIG. 14 illustrates a graphical user interface (GUI) of the communication system showing local and remote radio resources.

As shown in FIG. 14, the third party, e.g., network provider, may be provided with a list from one of the communication systems (e.g., master) of all radio resources in the network. This may be to perform a monitoring function. The radio resources with IP addresses of 127.0.0.1 are local to the master communication system. Meanwhile, radio resources with the IP address 10.118.32.165 are remotely located from the master communication system. The list may appear on a GUI of a display of the master communication system. In turn, the list may be displayed on the network provider's display and can have the capability of being manipulated via a GUI thereon. For example, the user and the graphical user interface are shown in FIG. 4.

The cellular modems can be batch commanded according to design documents with command processing queues. Cellular surveys can be optimized by distributing RAT/Band times among available modems. This helps reduce or even eliminate seek and RF tuning time. This embodiment allows for efficient parallel processing of network scanning. Given the proliferation of radio access technologies and the continual addition of new frequency bands this is a critical technology to enable the capture of rich survey data. By allowing a singular modem to spend more time on a specific frequency the system is able to capture infrequently broadcast system information blocks.

Figure 15:
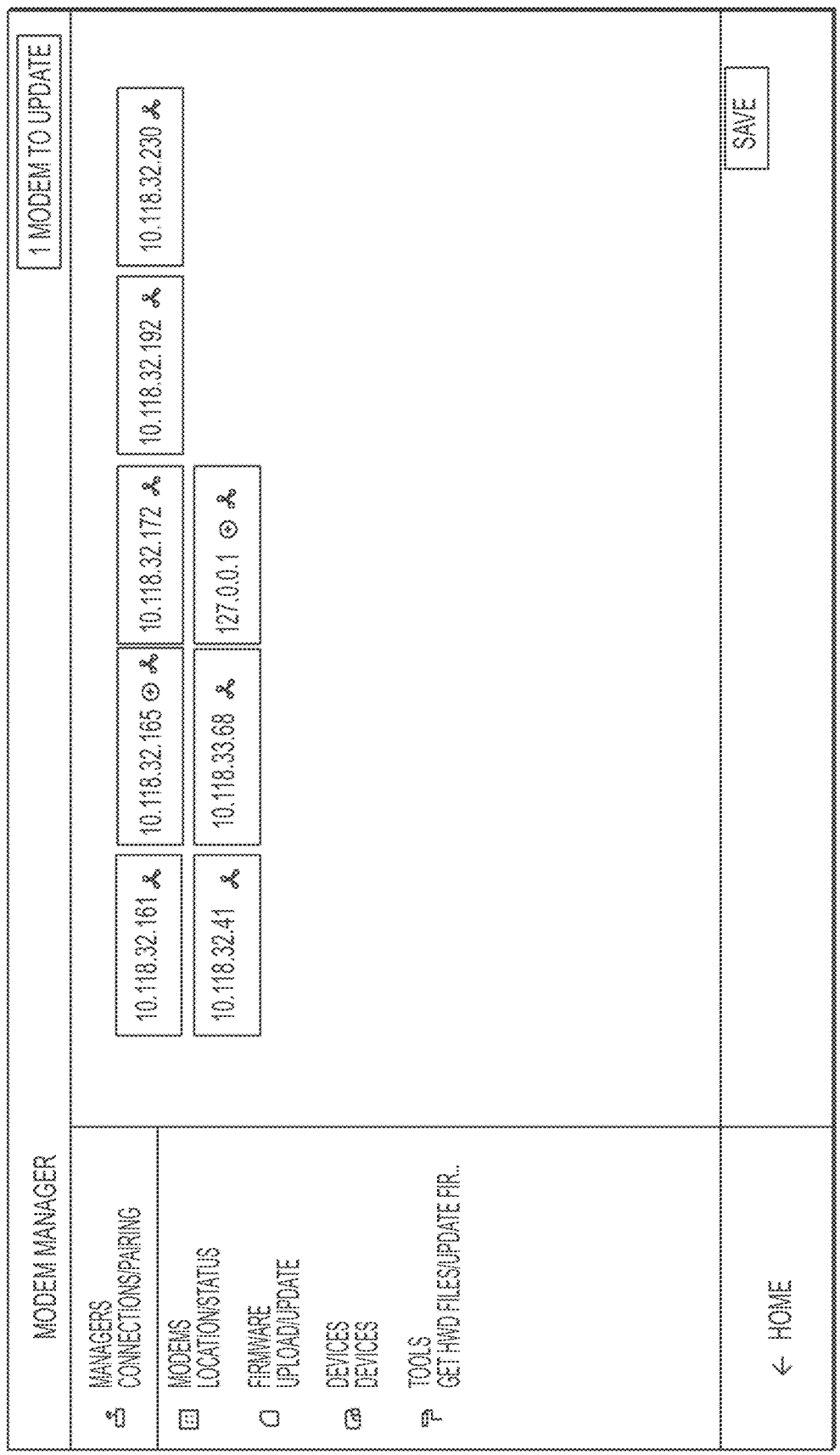
FIG. 15 illustrates a GUI of all communication systems including modem managers in a specified location.

FIG. 15 illustrates a GUI of modem manager software operating on the master communication system. The GUI may be sent to, or, shared in real-time, with the third party/network vendor. Under the tab, 'Managers,' communication systems with active radio resources appear different. Namely, these communication systems include some form of an indication after the IP address. Here, the indication is configured as a dot. The configuration may also include a color, such as for example blue or green to exemplify an active status. As shown in FIG. 15, two communication systems are indicated as having active radio resources based on the dot following the IP address. These two communication systems have IP addresses of 10.118.32.165 and 127.0.0.1.

Figure 16:
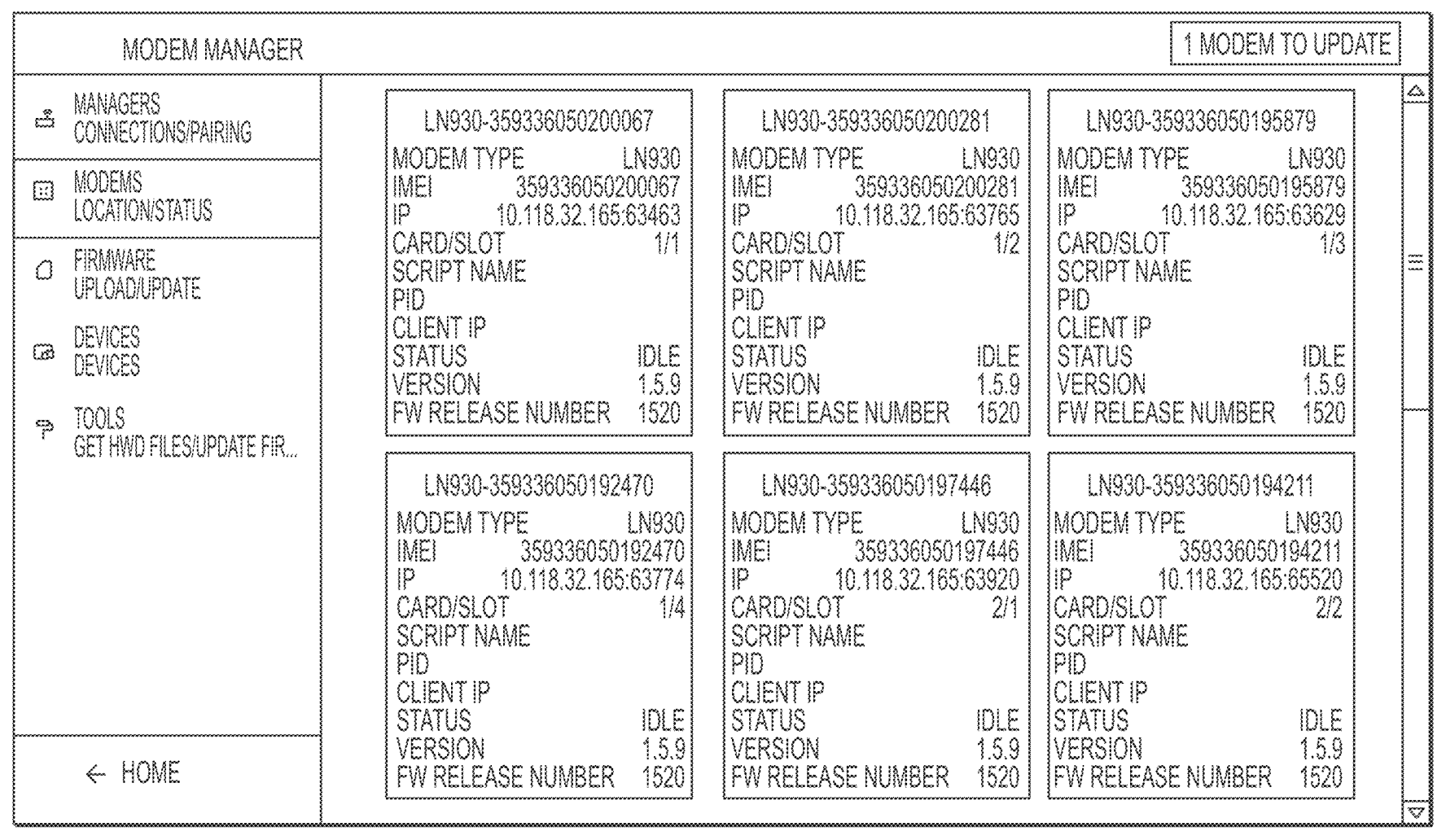

FIG. 16 illustrates another embodiment of the modem manager software. Here, the tab for populating the modems has been selected. In particular, this is shown on the GUI and describes specific radio resources with modems associated with the master communication system (address of 127.0.0.1). Since each of these modems has an IP address beginning with 10.118.32.165, they are considered remote.

Figure 17:
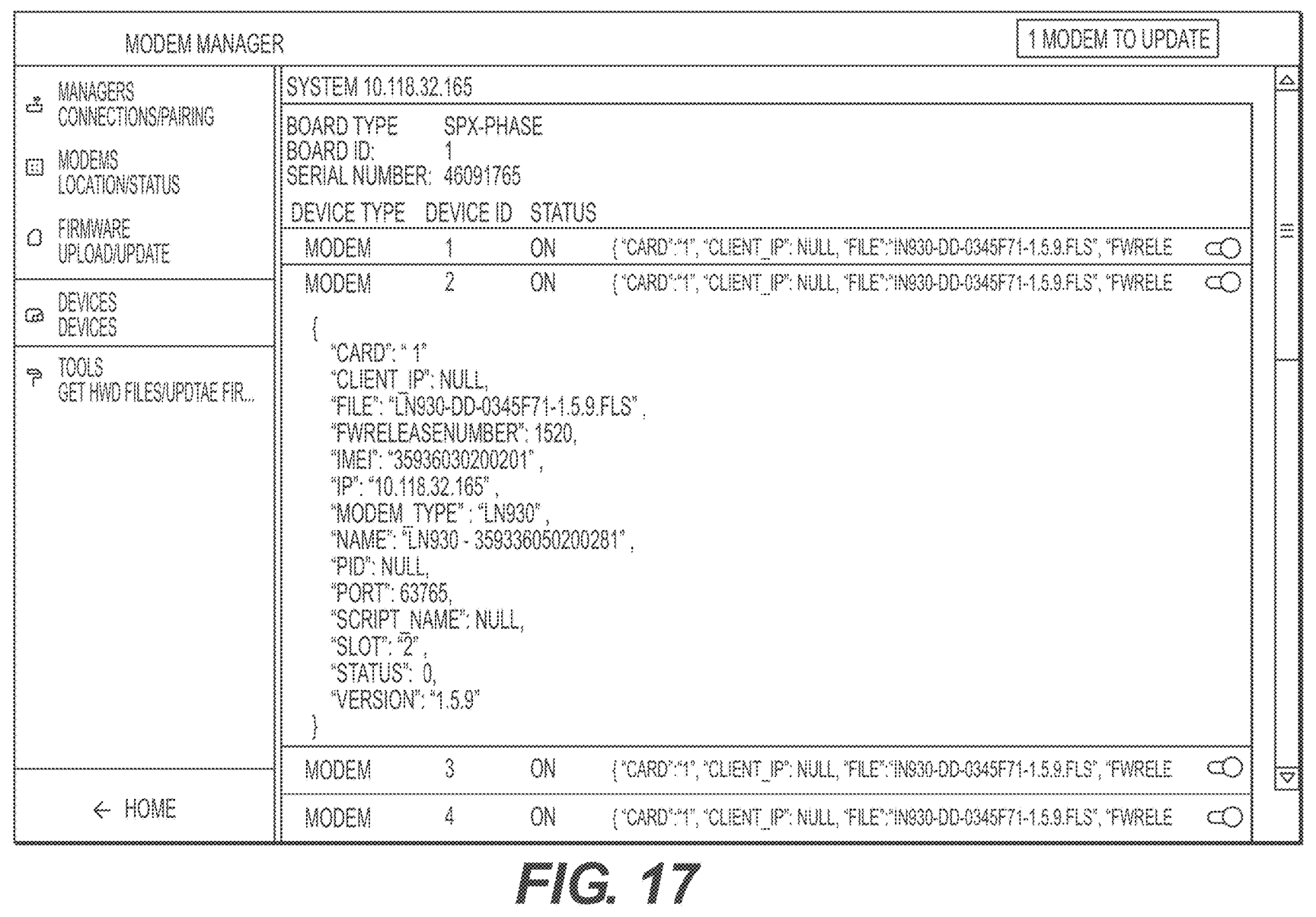

FIG. 17 is yet a further embodiment of the modem manager software, FIG. 17 illustrates a tab of the modem manager software associated with 'Devices.' This tab provides information on the physical devices, i.e., radio resources. For example, for modem 2, the status is on and its information includes card type, client, file, imei, IP address, modem type, name, product identification, port, script name, slot, status and version.

According to yet another embodiment, a request from a network provider may be received at the master communication system to conduct a test of the network. The master communication system may be used to rapidly load slices of the network to identify weak points in high traffic. By loading slices of the network, the communication system can assess whether any radio resources and clients/UEs are misbehaving. By having multiple modems/radio resources run against the RAN slice of a network, multiple messages can be tested in a rapid manner to determine maximum network capacity. In an exemplary embodiment, the testing may simulate activity corresponding to a large sporting event where many people request services simultaneously. Absent simulations, these multiple, concurrent requests for access is difficult to test without many UEs. To simulate more physical UEs, the communication system can rapidly reassign virtual UEs to a compliant Network Subsystem (NSS) with an accepting home or visitor location register (HLR/VLR). Network slice traffic generation with coordinated radio resources can greatly increase network robustness prior to deployment.

Figure 18C:
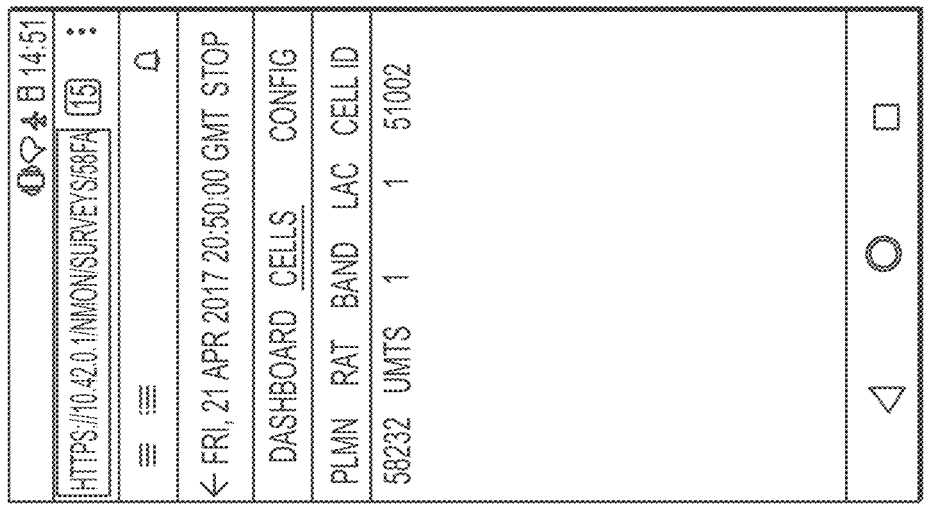
Figure 18B:
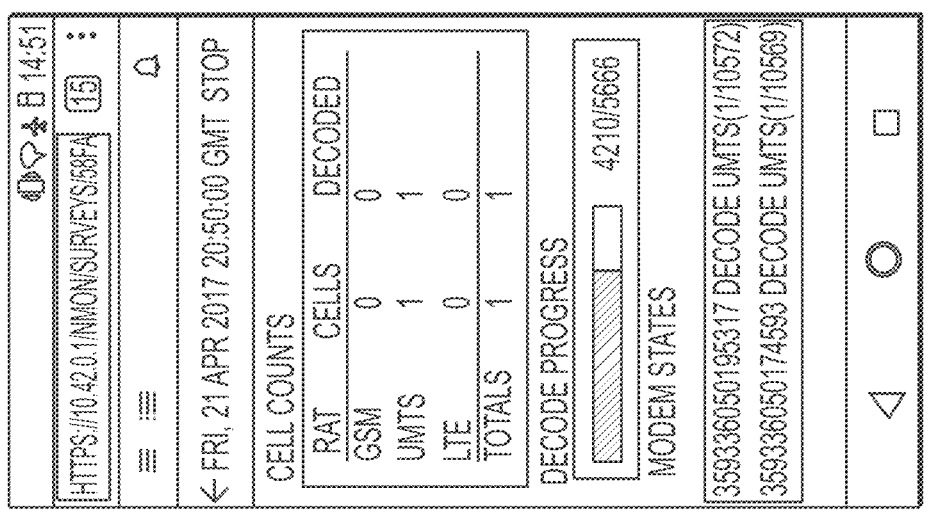
Figure 18A:
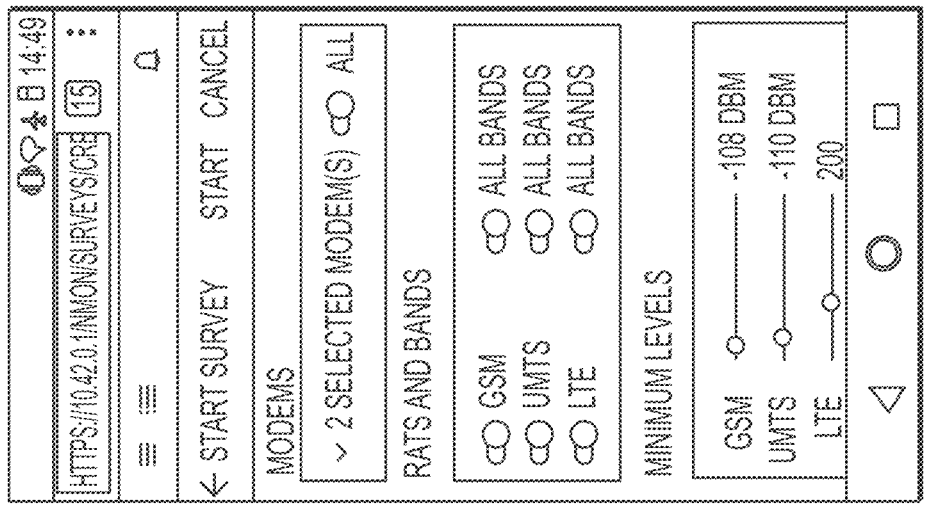

FIGS. 18A-E illustrate real-time GUIs of tests being conducted on the network. The GUIs may appear on a display of the master communication system or the network provider. For example, FIG. 18A illustrates a GUI of a cellular survey. The screen is titled 'Start Survey.' The survey can be started or canceled via prompts. Specifically, the number of radio resources/modems can be selected. Here, the prompt for all modems was selected resulting in 2 modems. Moreover, the prompt to select different RATs GSM, UMTS and LTE displays all being selected. All bands of each RAT were further selected. A GUI for 'Minimum Levels' appears beneath the GUI for RATs and Bands. The minimum and maximum level of each RAT is also customizable.

FIG. 18B illustrates a subsequent screen with a GUI. This screen shows an active survey. A prompt to stop the survey is also provided. As the scanning survey proceeds, the number of decoded cells is populated on the GUI in real-time. In particular, cell counts for each of the RATs are provided. As shown in FIG. 18B, 1 UMTS cell has been found and it has been decoded. Neither GSM nor LTE had any cells. As a result, there is one Total cell and it has been decoded.

Moreover, the 'Decode Progress' is provided beneath the 'Cell Counts' section. As shown, 4210 of 5666 cells have been decoded. The total number decoded is defined by the number of specific ARFCN/UARFCN/EARFCN in the selected RATs and bands designated by the user. Beneath the 'Cell Counts' section is a representation of 'Modem States'. In FIG. 18C, the second menu option of 'Cells' is displayed on the GUI. The other menu options are 'Dashboard' and 'Config.' As shown in FIG. 18C, the public land mobile network (PLMN) identity is 58232. The RAT is UMTS, the band is 1, the local area code (LAC) is 1, and the cell id is 51002.

Figures 18D, 18E:
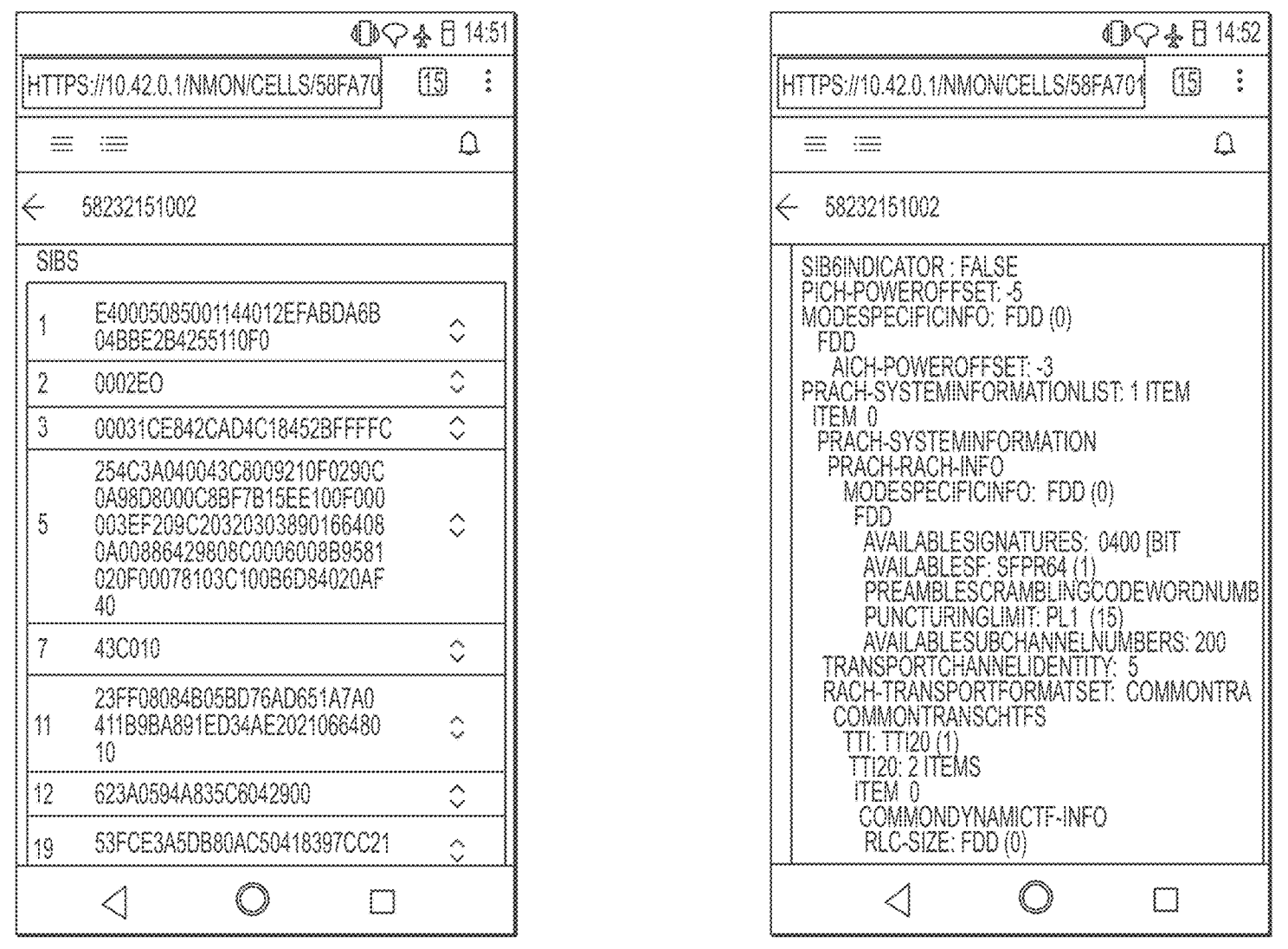

FIGS. 18D and 18E illustrate GUIs of stored information blocks (SIBs) for the cell 58232151002. System Information Blocks are critical in identifying the configuration of deployed networks. Understanding the broadcast SIBs can allow for reconfiguring the network to optimal conditions or identify rogue transmitters being broadcast in owned spectrum or on an incorrectly assigned PLMN.

In yet another embodiment of this aspect, a system for performing scanning instructions is provided. The system includes a single application processor, a non-transitory memory, and plural, discrete local radio resources operably in communication with the single application processor. Each of the local radio resources may include one or more modems. The single application processor is configured to execute the following instructions for scanning the network. One of the instructions includes receiving, from a third party, a request to run a scan of a network. The third party may include a network provider. The third party may also include data analytic companies.

In an exemplary embodiment, the request from the third party is to uncover active radio resources in the network. Active radio resources can be described as those radio resources with bandwidths to handle a request from the third party. Moreover, the request may be for a specific radio access technology. The technologies may include, for example, Bluetooth. Wi-Fi, 3G. 4G/LTE and 5G. The request may also be for a band of the radio access technology.

Another instruction includes scanning the network for the local radio resources. The single application processor is also configured to scan the network for remote radio resources each operably in communication with another single application processor. Information relating to the scanned local and remote radio resources can be displayed on the GUI. The local and remote radio resources operate in LoRa, digital mobile radio (DMR) and cellular. Active cells in the network that have been decoded while scanning may also be populated.

Next, the system can display information relating to the scanned local and remote radio resources. The information is selected from a public land mobile network identity, local area code, hand, radio access technology, cell id., signal strength, signal quality, last update, and combinations thereof. This is shown, for example, in FIG. 18C. Further, a report of the decoded active cells may be sent to the third party. It is envisaged that the report can sent upon obtaining predetermined criteria. For example, should specific characteristics such as RAT, band, signal strength and signal quality be determined for a partial subset of the radio resources in the network, the results of the located radio resources can be forward to the third party.

Another embodiment of this aspect is directed to a system for conducting testing of a network. The system may include a single application processor, a non-transitory memory, and plural, discrete local radio resources operably in communication with the single application processor. Each local radio resource includes one or more modems.

The single application processor is configured to execute a set of instructions related to network testing. Initially, the system receives a request from a third party to perform network testing. The third party, as discussed above, may be a network provider or a data analytics provider.

The request may include loading a slice of the network. Moreover, the request may be for a specific radio access technology. The technologies may include, for example, Bluetooth, Wi-Fi, 3G, 4G/LTE and 5G. The request may also be for a band of the radio access technology. By so doing, the network provider can obtain information on weak spots in high traffic. The network provider can also obtain information of misbehaving or uncertified UEs in the network.

Pursuant to the request, the system can determine the local radio resources and remote radio resources in the network. The remote radio resources are each operably in communication with another single application processor of another system in the network. Some remote radio resources may be in communication with a similar, other single application processor. As a result, these radio resources would be considered local to the same single application processor of another system (i.e., second system). These radio resources may be considered remote when viewed by the single application processor of the first system. The system may receive plural messages from the third party for the network test. The plural messages are intended to be sent to the local and remote radio resources in the network to test network capacity. The radio resources may operate in at least one of LoRa, MDR and WAN.

Upon receipt of the plural messages, the system may send them to a queue (FIG. 8). The queue is located in a radio access thread of the single application processor. The system then sends the messages to the local and remote radio resources in the network. Next, the system is configured to evaluate capacity of the network. The systems perform the evaluation based on how the radio resources respond to the plural messages. As shown, the radio resources can operate in at least one of cellular, DMR, LoRA, etc. In an embodiment, the radio resources operate in at least two of cellular, DMR or LoRA. In a further embodiment, the radio resources operate in at all three of cellular, DMR and LoRA. Finally, the system transmits data of the evaluated capacity to the third party.

According to a further embodiment, the single application processor may be configured to further execute the instructions of receiving a request from the third party to reassign radio resources to the network. This request occurs after the system sends data to the third party. By so doing, the system may run another test on the slice of the network. The system reviews active radio resources outside of the slice of the network. The information may be shown and manipulated on a GUI of a display. The system then determines the radio resources to reassign to the slice of the network. To do so, the single application processor communicates with the single application processor of another system with regard to utilizing its local radio resources. In one embodiment, the single application processor is part of the master communication system and is able to override other requests for radio resources. Subsequently, the master communication system may reassign the determined radio resources to the slice.

According to yet another embodiment, the system may receive additional messages from the third party to send along to radio resources in the slice of the network. Similar to the steps described above, the messages are received and sent to a queue in a radio access thread of the single application processor. The messages are then sent to the radio resources. Each of the radio resources responds to the single application processor with a status of the task. The single application processor aggregates all of the responses into a list. The list is evaluated and a further report is provided to the third party to reevaluate the network slice.

Figure 19:
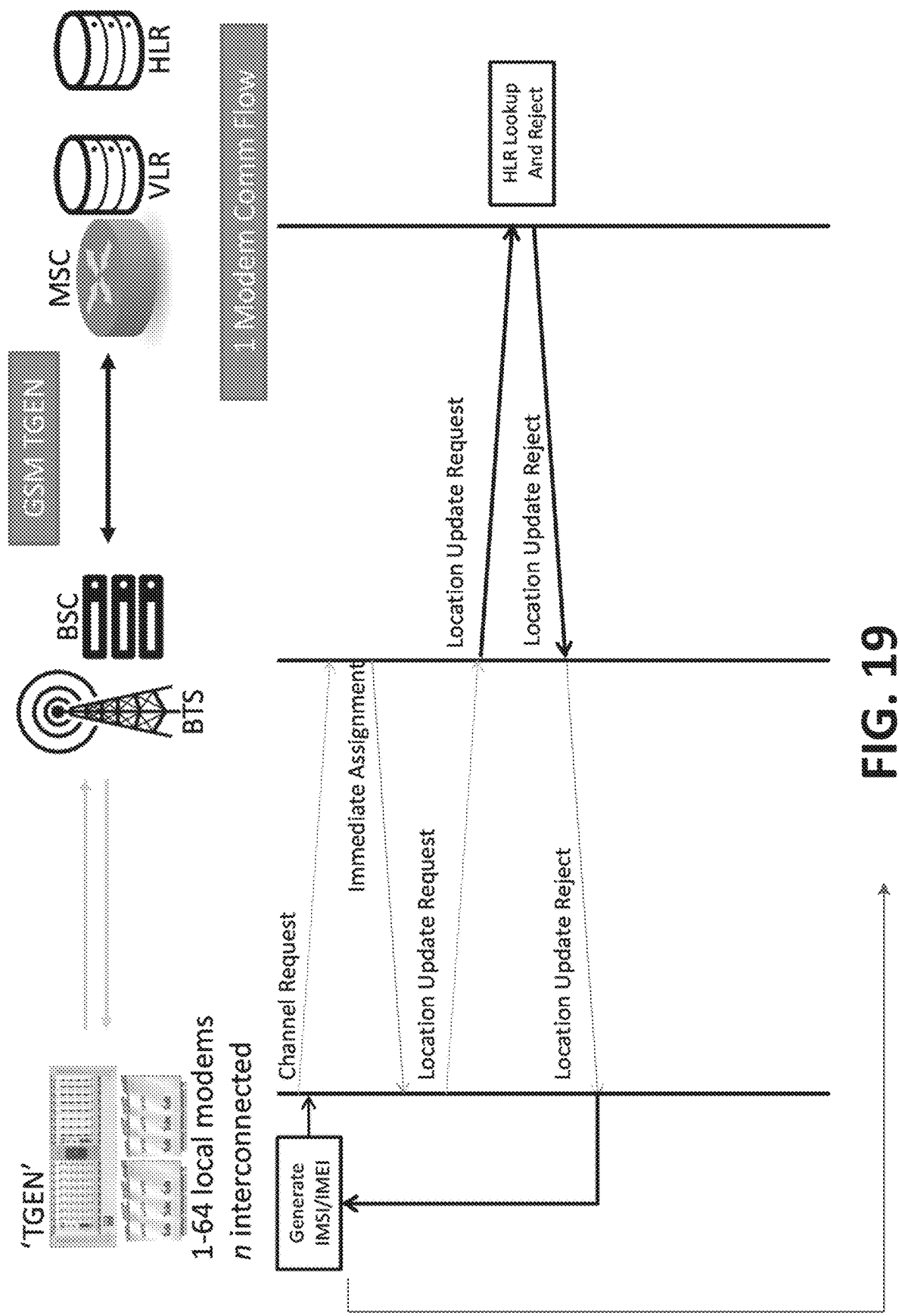
FIG. 19 illustrates protocols between a communication system including traffic generation software, a base transceiver station (BTS) controlled by a base station controller (BSC), and a mobile switching center (MSC) on the network according to an aspect of the application.

In a further embodiment, FIG. 19 illustrates a traffic generator module running on a master communication system to send a modem communication flow to a MSC. Here, the master communication system includes 64 radio resources including modems. In order to communicate with the MSC, the system requests a channel from the BTS/BSC. The BTS/BSC provides an immediate assignment. Thereafter, the master communication system sends a location update request, via the BTS/BSC, to the Messaging Service Center (MSC) including a visitor location register (VLR) and a home location register (HLR) on the GSM network.

The forwarded location update request to the MSC may be accepted or rejected. The MSC will perform an HLR lookup. Ultimately, the response from the MSC is sent via the BTS/BSC to the master communication system. If the location update was rejected, the master communication system can begin emulating another handset by changing both the IMSI and IMEI. This simulates the loading of a network in events where many subscribers are attempting to simultaneously register. These events can occur in and around natural disasters or in situations where nearby towers have a fault.

Figure 20:
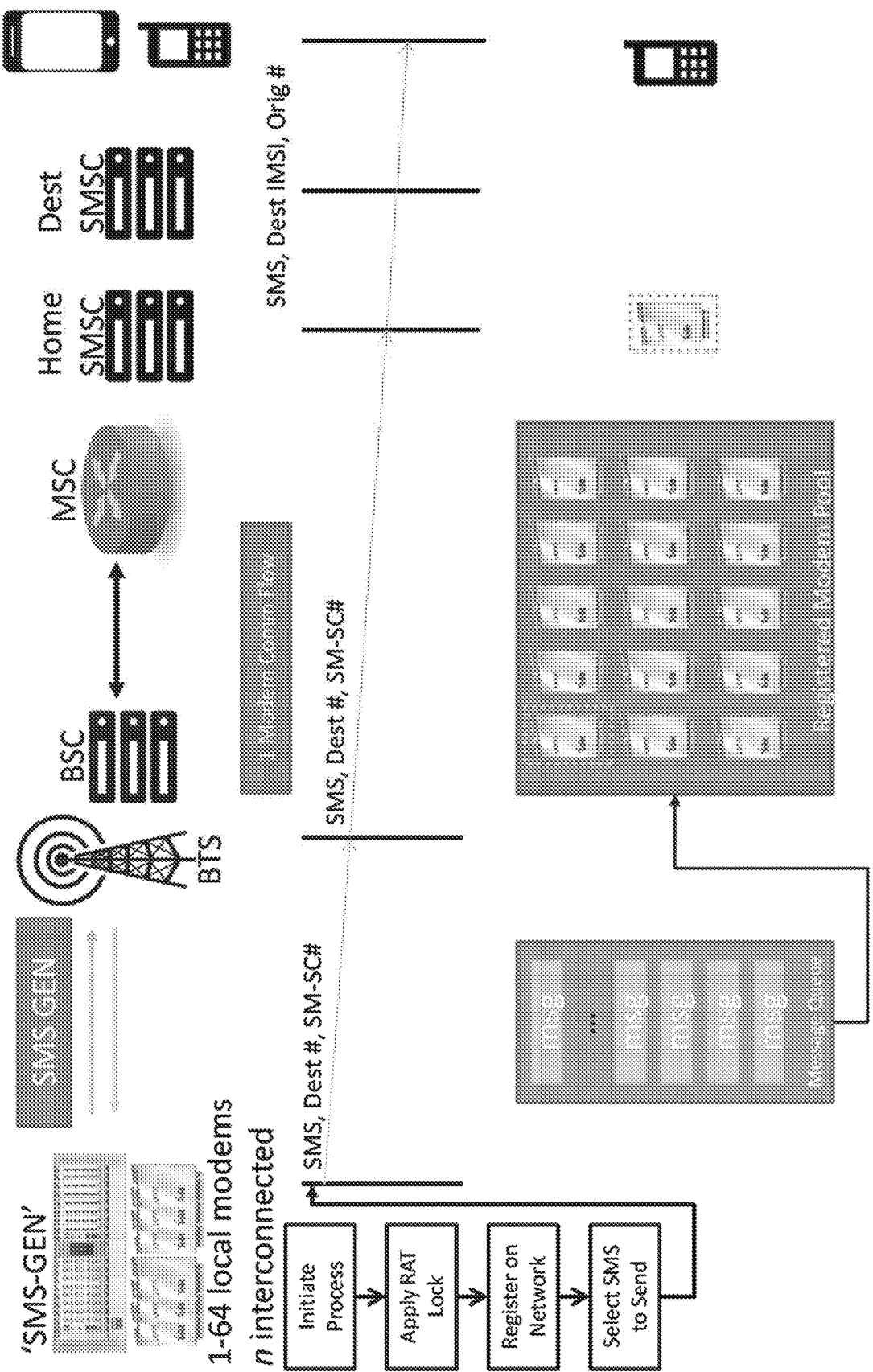
FIG. 20 illustrates an exemplary embodiment wherein SMS is generated by the communication system and sent to UEs via the BTS, SCS and MSC.

According to yet another embodiment, the communication system may include a SMS-Generator module as shown in FIG. 20. The SMS-Generator module of the communication system includes up to 64 interconnected local radio resources including modems. Similar to FIG. 19, the communication system may communicate with the UE over a network, i.e., GSM. In so doing, the communication system broadly performs the following tasks: (i) initiate a process, (ii) apply RAT lock, (iii) register on a network; and (iv) select a SMS to send to the UE. The SMS-Generator/communication system includes a bank of messages in a message queue. The communication system selects one of the modems from the registered modem pool to deliver the SMS message to the UE.

In order to deliver the SMS message, the communication system first must register on a network if not already done so. Once registration is complete, the communication system sends, via a selected modem, a SMS request including a destination # and a SM-SC #, to the BTS/BSC. In turn, the BTS/BSC communicates with the MSC and sends it the SMS, Dest # and SM-SC #. The MSC includes a Home SMSC and a Destination SMSC. The Home SMSC and Dest SMSC send the SMS request, Dest IMSI and original number to the UE. As a result, the UE receives the SMS message. This system can be used for emergency notification systems at business, automated verification systems, or for distribution of information to subscribed parties.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An apparatus comprising:
    a non-transitory memory including instructions stored thereon;
    a single application processor operably in communication with the non-transitory memory; and
    plural, discrete radio resources operably in communication with the single application processor, where each of the plural, discrete radio resources includes a modem operating on a network selected from at least one of LoRA, digital mobile radio and metro access network, where each modem has a separate IP address,
    wherein the single application processor is configured to execute the instructions of:
        discovering the modem of each of the plural, discrete radio resources,
        assigning a TCP port to each of the discovered modems,
        creating an individualized session for each of the modems, and
        scanning an area experiencing limited connectivity for mobile equipment located a predetermined distance away from the single application processor, and
    wherein a communication from a first mobile equipment is received via one of the radio resources through a first modem via a first wireless communication path, and the communication is transmitted via another one of the radio resources through a second modem via a second wireless communication path to a second mobile equipment.

2. The apparatus of claim 1, wherein the scan is based upon a last known address of the mobile equipment during a period of connectivity.

3. The apparatus of claim 1, wherein the scan includes receiving an address of the first mobile equipment based upon a message from second mobile equipment in the area.

4. The apparatus of claim 1, wherein the plural, discrete radio resources include at least three discrete radio resources.

5. The apparatus of claim 1, wherein the plural, discrete radio resources operate in the network selected from at least two of LoRA, digital mobile radio and metro access network.

6. The apparatus of claim 1, operating as an edge router in the network.

7. The apparatus of claim 1, wherein the single application processor is configured to execute the instructions of commanding each modem via an IP address and the assigned TCP port.

8. The apparatus of claim 1, wherein the single application processor is configured to close the individualized session created for one of the radio resources.

9. A system comprising:
    a non-transitory memory including instructions stored thereon;
    a single application processor operably in communication with the non-transitory memory; and
    plural, discrete radio resources operably in communication with the single application processor, where each of the plural, discrete radio resources includes a modem operating on a network selected from at least two of LoRA, digital mobile radio and metro access network, where each modem has a separate IP address;
    wherein the system is configured to communicate with mobile equipment positioned in an area experiencing limited network connectivity located a predetermined distance away from the single application processor, and
    wherein a communication from a first mobile equipment is received by one of the radio resources through a first modem via a first wireless communication path, and the communication is sent from another one of the radio resources through a second modem via a second wireless communication path to a second mobile equipment.

10. The system of claim 9, wherein the single application processor is configured to execute the instructions of:
sending a request originating from the mobile equipment to a cellular network;
receiving a reply from the cellular network; and
sending, via the one of the radio resources, the reply to the mobile equipment.

11. The system of claim 9, wherein the single application processor is configured to execute the instructions of receiving, via the one of the radio resources, a request from the first mobile equipment to send a communication to the second mobile equipment in the area.

12. The system of claim 11, wherein the single application processor is configured to execute the instructions of sending, via the other one of the radio resources, the communication to the second mobile equipment.

13. The system of claim 9, wherein the single application processor, non-transitory memory and plural radio resources reside within a single device.

14. A non-transitory computer readable medium containing program instructions that, when executed by a processor, causes the processor to:
discover a modem for each of plural, discrete radio resources operating on a network, where each modem has a separate IP address, and where the network is selected from at least one of LoRA, digital mobile radio and metro access network;
assign a TCP port to each of the discovered modems;
create an individualized session for each of the modems; and
communicate with mobile equipment positioned in an area experiencing limited network connectivity located a predetermined distance away from the processor,
wherein a communication from a first mobile equipment is received by one of the radio resources through a first modem via a first wireless communication path, and the communication is sent from another one of the radio resources through a second modem via a second wireless communication path to a second mobile equipment.

15. The non-transitory computer readable medium of claim 14, wherein the program instructions upon execution by the processor further cause the processor to determine, via one of the radio resources, whether the mobile equipment has a registered application associated with a user.

16. The non-transitory computer readable medium of claim 14, wherein a communication with the mobile equipment is via a commercial messaging application, voice or SMS.

17. The non-transitory computer readable medium of claim 14, wherein the program instructions upon execution by the processor further cause the processor to:
command each modem via an IP address and the assigned TCP port, and
close the individualized session created for one of the radio resources.

18. The non-transitory computer readable medium of claim 14, wherein the plural, discrete radio resources include at least three discrete radio resources.

19. The non-transitory computer readable medium of claim 14, wherein the plural, discrete radio resources operate in the network selected from at least two of LoRA, digital mobile radio and metro access network.

* * * * *